US012608125B2

(12) United States Patent
Lee et al.

(10) Patent No.:     US 12,608,125 B2
(45) Date of Patent:        Apr. 21, 2026

(54) ELECTRONIC DEVICE AND METHOD FOR PROCESSING HANDWRITING INPUT THEREOF

(71) Applicant: Samsung Electronics Co., Ltd., Gyeonggi-do (KR)

(72) Inventors: Donghyuk Lee, Gyeonggi-do (KR); Taewon Kwak, Gyeonggi-do (KR); Kyungmin Kim, Gyeonggi-do (KR); Dohyeon Kim, Gyeonggi-do (KR); Jungrim Kim, Gyeonggi-do (KR); Jihoon Kim, Gyeonggi-do (KR); Gibeyong Park, Gyeonggi-do (KR); Jeongwan Park, Gyeonggi-do (KR); Jinsu Shin, Gyeonggi-do (KR); Konsang Lee, Gyeonggi-do (KR); Seungcheol Lee, Gyeonggi-do (KR); Bongje Cho, Gyeonggi-do (KR); Munwon Choi, Gyeonggi-do (KR); Seowon Choi, Gyeonggi-do (KR); Eunji Choi, Gyeonggi-do (KR); Yeunwook Lim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 18/491,152

(22) Filed: Oct. 20, 2023

(65) Prior Publication Data

US 2024/0045587 A1      Feb. 8, 2024

Related U.S. Application Data

(63) Continuation of application No. 16/986,971, filed on Aug. 6, 2020, now Pat. No. 11,829,597.

(30) Foreign Application Priority Data

Aug. 6, 2019      (KR) ........................ 10-2019-0095736

(51) Int. Cl.
   *G06F 3/04883*      (2022.01)
   *G06F 3/038*      (2013.01)
   (Continued)

(52) U.S. Cl.
   CPC ........ *G06F 3/04883* (2013.01); *G06F 40/171* (2020.01); *G06V 30/1423* (2022.01);
   (Continued)

(58) Field of Classification Search
   CPC .. G06F 3/04883; G06F 40/171; G06F 3/0416; G06F 3/0488; G06F 3/03545;
   (Continued)

(56) References Cited

U.S. PATENT DOCUMENTS

| | | | |
|---|---|---|---|
| 6,600,834 | B1 | 7/2003 | Su et al. |
| 8,116,569 | B2 | 2/2012 | Markiewicz et al. |

(Continued)

FOREIGN PATENT DOCUMENTS

| | | |
|---|---|---|
| CN | 1260526 | 7/2000 |
| JP | 05-225399 | 9/1993 |

(Continued)

OTHER PUBLICATIONS

Chinese Office Action dated Jul. 31, 2024 issued in counterpart application No. 202080054202.8, 17 pages.

(Continued)

*Primary Examiner* — Douglas Wilson
(74) *Attorney, Agent, or Firm* — The Farrell Law Firm, P.C.

(57)        ABSTRACT

Disclosed is an electronic device including a touch screen, a memory and a processor, wherein the memory stores instructions that, when executed, cause the at least one processor to detect a handwriting recognition request for a first handwriting input while displaying the first handwriting input on the touch screen, in response to detecting the (Continued)

handwriting recognition request, perform the handwriting recognition for the first handwriting input to identify a text corresponding to the first handwriting input, apply at least one color of the first handwriting input identified based on the handwriting recognition to the text, present a first rich text to which the at least one color has been applied, adjacent to the first handwriting input, and in response to a request for replacing the first handwriting input with the first rich text, replace the first handwriting input with the first rich text.

19 Claims, 21 Drawing Sheets

(51) Int. Cl.

| | |
|---|---|
| *G06F 3/041* | (2006.01) |
| *G06F 3/0488* | (2022.01) |
| *G06F 40/171* | (2020.01) |
| *G06V 30/142* | (2022.01) |
| *G06V 30/226* | (2022.01) |
| *G06V 30/32* | (2022.01) |
| *G06F 3/0354* | (2013.01) |

(52) U.S. Cl.
CPC ............ *G06V 30/226* (2022.01); *G06V 30/32* (2022.01); *G06F 3/03545* (2013.01); *G06F 3/038* (2013.01); *G06F 3/0416* (2013.01); *G06F 3/0488* (2013.01); *G06V 30/387* (2022.01)

(58) Field of Classification Search
CPC .... G06F 3/038; G06V 30/1423; G06V 30/32; G06V 30/226; G06V 30/387
See application file for complete search history.

(56) References Cited

U.S. PATENT DOCUMENTS

| | | | |
|---|---|---|---|
| 10,489,642 B2 | 11/2019 | Xi et al. | |
| 11,080,472 B2 | 8/2021 | Matsuda et al. | |
| 11,194,467 B2 | 12/2021 | Zhu | |
| 2005/0105799 A1 | 5/2005 | Strohecker et al. | |
| 2012/0121181 A1* | 5/2012 | Markiewicz | G06V 30/387 382/186 |
| 2012/0320842 A1 | 12/2012 | Jeong | |
| 2013/0298071 A1* | 11/2013 | Wine | G06F 3/04883 715/780 |
| 2013/0311880 A1 | 11/2013 | Shin | |
| 2014/0164974 A1 | 6/2014 | Kim | |
| 2014/0363083 A1 | 12/2014 | Xia et al. | |
| 2015/0077358 A1 | 3/2015 | Wang | |

| | | | |
|---|---|---|---|
| 2015/0082153 A1 | 3/2015 | Jung | |
| 2015/0089389 A1 | 3/2015 | Cohen-Zur | |
| 2015/0123988 A1 | 5/2015 | Ohmori et al. | |
| 2015/0346996 A1 | 12/2015 | Ogawa et al. | |
| 2016/0179764 A1 | 6/2016 | Kelso et al. | |
| 2018/0011597 A1 | 1/2018 | Lee et al. | |
| 2018/0032495 A1 | 2/2018 | Matsuda | |
| 2019/0114478 A1* | 4/2019 | Xi | G06F 3/04883 |
| 2019/0163359 A1* | 5/2019 | Dixon | G06F 3/0237 |
| 2019/0303423 A1 | 10/2019 | Thimbleby | |
| 2019/0332259 A1 | 10/2019 | Markiewicz | |
| 2020/0008247 A1 | 1/2020 | Kwak | |
| 2020/0236716 A1 | 7/2020 | Lei | |
| 2020/0356254 A1 | 11/2020 | Missig | |
| 2020/0379638 A1* | 12/2020 | Zhu | G06F 3/04842 |
| 2021/0289536 A1 | 9/2021 | Liu | |
| 2022/0046713 A1 | 2/2022 | Park | |
| 2022/0124831 A1 | 4/2022 | Taherzadeh Boroujeni | |
| 2022/0197493 A1* | 6/2022 | Missig | G06F 3/04883 |
| 2022/0210844 A1 | 6/2022 | MotavianJazi | |
| 2022/0330068 A1 | 10/2022 | Yuan | |

FOREIGN PATENT DOCUMENTS

| | | |
|---|---|---|
| JP | 6259599 | 9/1994 |
| JP | 10-063656 | 3/1998 |
| JP | 2014-099182 | 5/2014 |
| JP | 2015-5225525 | 12/2015 |
| JP | 2016-162073 | 9/2016 |
| JP | 6221220 | 11/2017 |
| KR | 101144675 | 5/2012 |
| KR | 101997447 | 7/2019 |
| WO | WO 2016/170691 | 10/2016 |

OTHER PUBLICATIONS

KR Notice of Patent Grant dated Aug. 7, 2024 issued in counterpart application No. 10-2019-0095736, 6 pages.
Korean Office Action dated Apr. 23, 2024 issued in counterpart application No. 10-2019-0095736, 18 pages.
European Search Report dated Apr. 10, 2024 issued in counterpart application No. 20850616.2-1218, 11 pages.
International Search Report dated Nov. 27, 2020 issued in counterpart application No. PCT/KR2020/010421, 8 pages.
European Search Report dated Jul. 13, 2022 Issued in counterpart application No. 20850616.2-1224, 12 pages.
Chinese Office Action dated Mar. 3, 2025 issued in counterpart application No. 202080054202.8, 18 pages.
Jiesu OCR3.0 Image Recognition Software, Jan. 12, 2017, 6 pages.
CN Rejection Decision dated May 16, 2025 issued in counterpart application No. 202080054202.8, 16 pages.
ABBYY FineReader Pro V12.0.101.496 Professional Edition, Apr. 30, 2018, 11 pages.

* cited by examiner

ELECTRONIC DEVICE AND METHOD FOR PROCESSING HANDWRITING INPUT THEREOF

CROSS-REFERENCE TO RELATED APPLICATION(S)

This application is a Continuation Application of U.S. patent application Ser. No. 16/986,971, which was filed on Aug. 6, 2020, and is based on and claims priority under U.S.C. § 119 to Korean Patent Application No. 10-2019-0095736, filed on Aug. 6, 2019, in the Korean Intellectual Property Office, the disclosure of each of which is incorporated by reference herein in its entirety.

BACKGROUND

1. Field

The disclosure relates to an electronic device, and a method for processing a handwriting input in the electronic device.

2. Description of Related Art

Electronic devices, such as a mobile terminal, a smart phone, and a wearable terminal, can provide various functions for music playing, navigation, short-range wireless communication including Bluetooth™, wireless fidelity (Wi-Fi), and near field communication (NFC), fingerprint recognition, photographing or video shooting, and electronic payment, for example.

The electronic device can also include a writing input function which uses an input device, such as a stylus pen, an electronic pen, or a user's finger, and can provide a writing recognition function of converting a writing input into a text.

SUMMARY

With a writing input, a user can configure various attributes such as color, thickness, and writing brush type. The writing input can have various characteristics such as letter size, line type, alignment, writing style, pressure, slope, and stroke characteristic including a slope of a stroke end. However, the electronic device conventionally converts the writing input into a text having a designated attribute without considering an attribute and characteristic of the writing input at the time of writing recognition. Thus, the writing recognition function has a problem and/or inconvenience in that a user has to change the attribute of the text after completing the text conversion.

The writing recognition function can be automatically performed according to a user's command after the writing input has been completed or when it is determined that the writing input has been completed, such as when no writing input is detected during a predetermined time. Thus, the writing recognition function is further inconvenient since a user of an electronic device cannot know the writing recognition result until prior to completion of the writing recognition.

As such, there is a need in the art for an electronic device that more conveniently enables a user to handle attribute modification and determine writing recognition results during a writing input function.

Aspects of the disclosure are to address at least the above-mentioned problems and/or disadvantages and to provide at least the advantages described below. Accordingly, an aspect of the disclosure is to provide an electronic device that considers an attribute and/or characteristic of a handwriting input, to perform handwriting recognition.

Another aspect of the disclosure is to provide an electronic device that performs handwriting recognition for a handwriting input in real time, and presents a preview of the handwriting recognition result.

In accordance with an aspect of the disclosure, an electronic device includes a touch screen, a memory and a processor, wherein the memory stores instructions that, when executed, cause the at least one processor to detect a handwriting recognition request for a first handwriting input while displaying the first handwriting input on the touch screen, in response to detecting the handwriting recognition request, perform the handwriting recognition for the first handwriting input to identify a text corresponding to the first handwriting input, apply at least one color of the first handwriting input identified based on the handwriting recognition to the text, present a first rich text to which the at least one color has been applied, adjacent to the first handwriting input, and in response to a request for replacing the first handwriting input with the first rich text, replace the first handwriting input with the first rich text.

In accordance with another aspect of the disclosure, a method for processing a handwriting input in an electronic device includes detecting a handwriting recognition request for a first handwriting input while displaying the first handwriting input on a touch screen of the electronic device, in response to detecting the handwriting recognition request, performing the handwriting recognition for the first handwriting input to identify a text corresponding to the first handwriting input, applying at least one color of the first handwriting input identified based on the handwriting recognition to the text, presenting a first rich text to which the at least one color has been applied, adjacent to the first handwriting input, and in response to a request for replacing the first handwriting input with the first rich text, replacing the first handwriting input with the first rich text.

BRIEF DESCRIPTION OF THE DRAWINGS

The above and other aspects, features and advantages of certain embodiments of the disclosure will be more apparent from the following detailed description, taken in conjunction with the accompanying drawings, in which.

DETAILED DESCRIPTION

Figure 1:
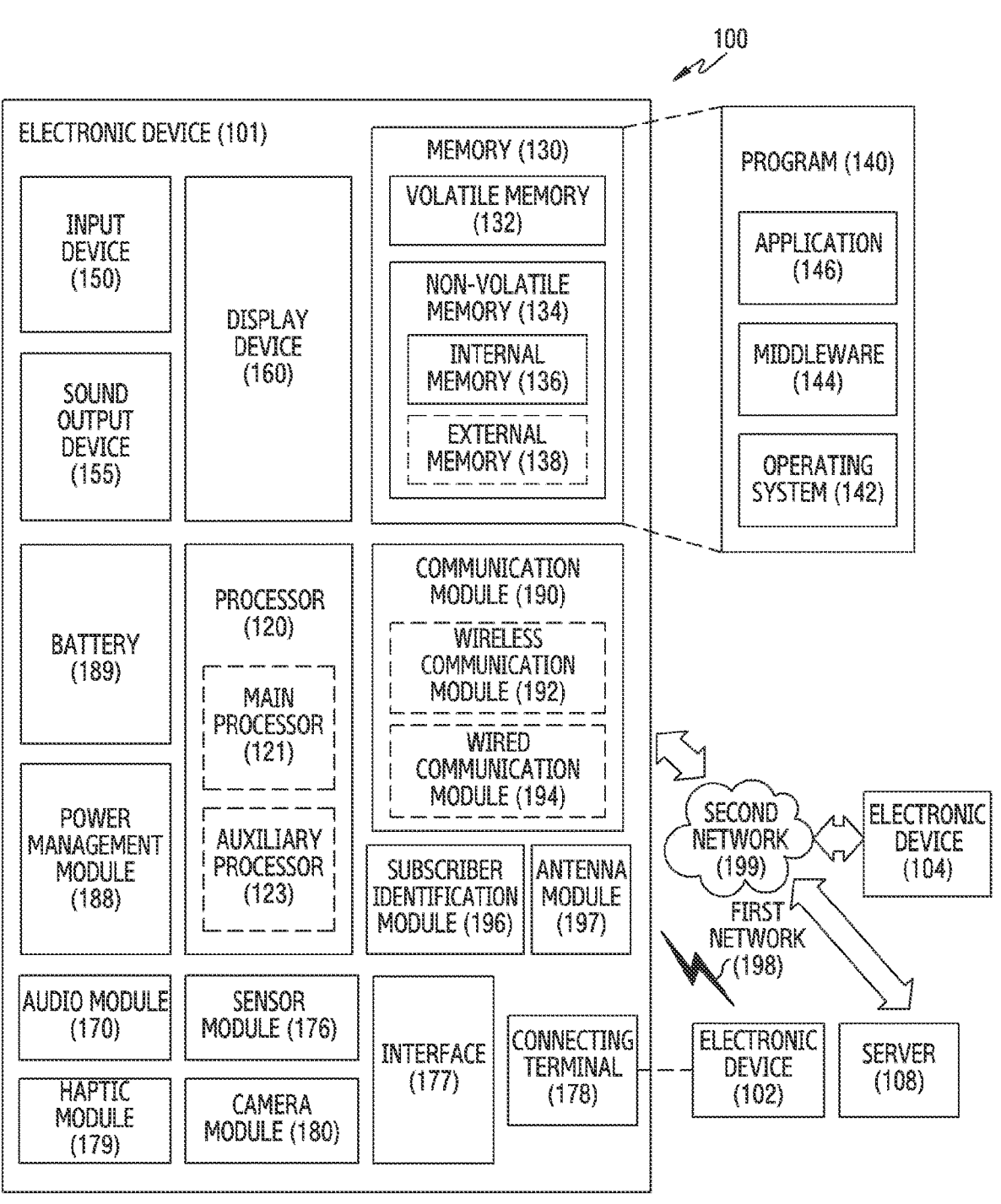
FIG. 1 is a block diagram of an electronic device within a network environment according to an embodiment.

Hereinafter, embodiments will be described in detail with reference to the accompanying drawings. Although specific embodiments are illustrated in the drawings and described in detail with reference thereto, this is not to limit the embodiments to specific forms. For example, it would be obvious to a person skilled in the art to which the disclosure pertains that the embodiments can be modified. Detailed descriptions of known functions and/or configurations will be omitted for the sake of clarity and conciseness.

FIG. 1 is a block diagram illustrating an electronic device 101 in a network environment 100 according to an embodiment.

Referring to FIG. 1, the electronic device 101 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) card 196, or an antenna module 197. At least one (e.g., the display device 160 or the camera module 180) of the components may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store data used by at least one component (e.g., the processor 120 or the sensor module 176) of the electronic device 101. The data may include, for example, software (e.g., the program 140) and input data or output data for a command related to the data. The memory 130 may include the volatile memory 132 or the non-volatile memory 134.

The program 140 may be stored in the memory 130 as software and may include an operating system (OS) 142, middleware 144, or an application 146.

The input device 150 may receive a command or data to be used by another component (e.g., the processor 120) of the electronic device 101, from the outside (e.g., user) of the electronic device 101. The input device 150 may include a microphone, a mouse, a keyboard, or a digital pen (e.g., a stylus pen).

The sound output device 155 may output sound signals to the outside of the electronic device 101. The sound output device 155 may include a speaker or a receiver. The speaker may be used for general purposes, such as playing multimedia or playing record, and the receiver may be used for incoming calls. The receiver may be implemented as separate from, or as part of the speaker.

The display device 160 may visually provide information to the outside (e.g., a user) of the electronic device 101. The display device 160 may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). The connecting terminal 178 may include a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include a motor, a piezoelectric element, or an electric stimulator.

The camera module 180 may capture a still image or moving images. The camera module 180 may include one or more lenses, image sensors, ISPs, or flashes.

The power management module 188 may manage power supplied to the electronic device 101. The power management module 188 may be implemented as at least part of a power management integrated circuit (PMIC).

The battery 189 may supply power to at least one component of the electronic device 101. The battery 189 may include a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the application processor (AP)) and supports a direct (e.g., wired) communication or a wireless communication. The communication module 190 may include a wireless communication module 192, such as a cellular communication module, a short-range wireless communication module, or a global navigation satellite system (GNSS) communication module, or a wired communication module 194, such as a local area network (LAN) communication module or a power line communication (PLC) module. A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM card 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate, such as a printed circuit board (PCB). The antenna module 197 may include a plurality of antennas. In such a case, at least one antenna appropriate for a communication scheme used in the communication network, such as the first network 198 or the second network 199, may be selected by the communication module 190 (e.g., the wireless communication module 192) from the plurality of antennas. The signal or the power may then be transmitted or received between the communication module 190 and the external electronic device via the selected at least one antenna. Another component, such as a radio frequency integrated circuit (RFIC), other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud, distributed, or client-server computing technology may be used, for example.

According to an embodiment, an electronic device (e.g., the electronic device 101) may include a touch screen (e.g., the display device 160), a processor (e.g., the processor 120) operatively connected with the touch screen, and a memory (e.g., the memory 130) operatively connected with the processor, wherein the memory may store instructions, which when executed, cause the processor to control the electronic device to: perform handwriting recognition for a first handwriting input of a user displayed on the touch screen, to convert the first handwriting input into a text, identify at least one of an attribute or characteristic of the first handwriting input, apply at least one of the identified attribute or characteristic to the converted text, and in response to a request for conversion of the first handwriting input, replace the first handwriting input into a text (hereinafter, a first rich text) to which the identified at least one of the attribute or characteristic has been applied.

The memory may further store instructions cause the processor to control the electronic device to present, before replacing the first handwriting input into the first rich text, a preview window comprising the first rich text to a location adjacent to the first handwriting input.

The memory may further store instructions cause the processor to control the electronic device to copy, in response to a request for copy of the first rich text being detected, the first rich text comprised in the preview window, or display, in response to a request for obtaining of the first rich text being detected, the first handwriting input and the first rich text, together.

The memory may further store instructions cause the processor to control the electronic device to detect the first handwriting input and, in response to an additional handwriting input not being detected during a specified time after the detecting of the first handwriting input or in response to a handwriting recognition command by a user being received, perform the handwriting recognition for the first handwriting input.

The memory may further store instructions cause the processor to control the electronic device to re-perform, in response to editing of a portion of the first handwriting input, the handwriting recognition for a range which has been specified with a criterion of the portion.

The preview window may comprise a rich text for a specified range of the first handwriting input, wherein the specified range may comprise one line, a plurality of lines which have been specified with a criterion of a location where the handwriting input has been provided, or one screen, and may be changeable by a user.

The memory may further store instructions cause the processor to control the electronic device to identify, in response to a second handwriting input being added after replacing the first handwriting input into the first rich text, a relationship between the second handwriting input and the first rich text, determine a location of a second rich text having converted the second handwriting input based on the identified relationship, and display the second rich text in the determined location.

The memory may further store instructions cause the processor to control the electronic device to replace, in response to a third handwriting input overlapped with at least part of the first rich text being added after replacing the first handwriting input into the first rich text, at least part of the first rich text into a third rich text having converted the third handwriting input.

The memory may further store instructions cause the processor to control the electronic device to classify the first handwriting input into a text and a non-text, perform line separation for the classified text, identify at least one target line which will perform the handwriting recognition, and perform the handwriting recognition for the entire or part of the identified at least one target line.

The memory may further store instructions cause the processor to control the electronic device to output an error message in response to the line separation not being possible or the handwriting recognition not being possible.

Figure 2:
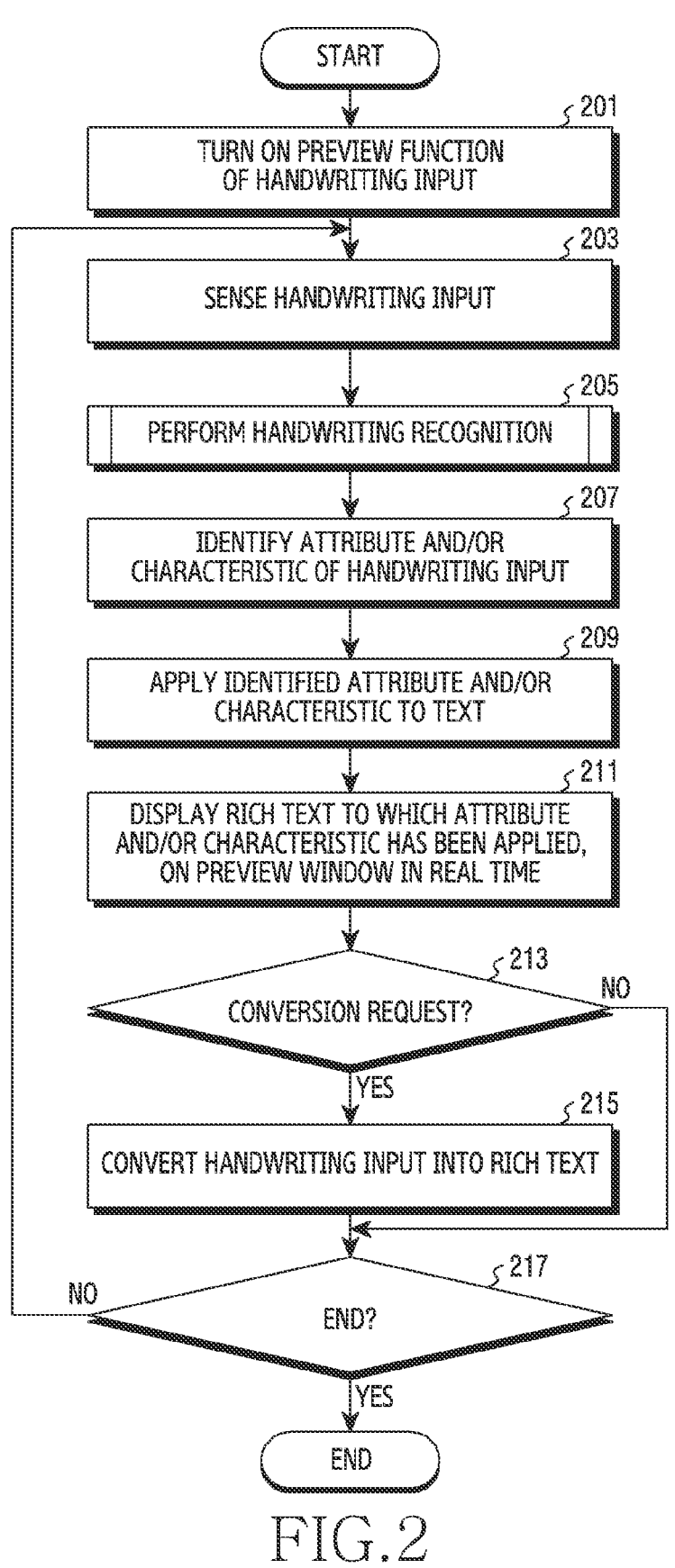
FIG. 2 illustrates a method for processing a handwriting input in an electronic device according to an embodiment.

FIG. 2 illustrates a method for processing a handwriting input in an electronic device according to an embodiment.

Referring to FIG. 2, in operation 201, a processor (e.g., the processor 120) of the electronic device (e.g., the electronic device 101) may turn ON (or enable) a preview function for a handwriting input. The preview function may recognize a user handwriting input which uses an input device (e.g., the input device 150) (e.g., a digital pen, a stylus pen, a finger, etc.), and present its recognition result (e.g., a text) through a preview window.

In response to the execution of an application in which a handwriting input is possible (below, a handwriting app) (e.g., a memo app, a note app, etc.), the processor may automatically turn ON the preview function. The preview function may be turned ON or OFF by a user through a configuration menu of the electronic device, a menu included in the handwriting app, or a specified gesture input.

In operation 203, the processor may sense a handwriting input. For example, the processor may sense the handwriting input through a touch circuit (e.g., a capacitive touch circuit, an electromagnetic induction touch circuit, etc.) included in a display (e.g., the display device 160).

In operation 205, the processor may perform handwriting recognition. For example, the processor may convert the handwriting input into a text through the handwriting recognition. A detailed description of the text conversion method will be made later with reference to FIGS. 5, 6A and 6B.

In operation 207, the processor may identify an attribute and/or characteristic of the handwriting input. For example, the processor may identify the attribute of the handwriting input, such as a color, a thickness, and a writing brush type, and/or the characteristic of the handwriting input including a letter size, a line, alignment, a slope, and a stroke characteristic (e.g., a slope of a stroke end).

In operation 209, the processor may apply the identified attribute and/or characteristic to the text. For example, the processor may separate a line of the text correspondingly to line separation of the handwriting input, align the line of the text correspondingly to line alignment of the handwriting input, determine a color of the text to correspond to a color of the handwriting input, determine a size of the text based on a size of the handwriting input, determine a thickness of the text (e.g., determine bold applying or non-applying) correspondingly to a thickness of the handwriting input (or a pressure at handwriting input), determine a slope of the text (e.g., determine slope shape applying or non-applying) corresponding to a slope of the handwriting input (or a slope of an electronic pen), and determine the applying or non-applying of serif to the text according to the pen type selected at the handwriting input (or a stroke characteristic of the handwriting input).

In operation 211, the processor may display the text (below, rich text) to which the attribute and/or characteristic has been applied, on a preview window in real time. For example, the processor may display the preview window including the rich text immediately correspondingly to the handwriting input or when it is determined that the handwriting input has been completed.

Figure 3:
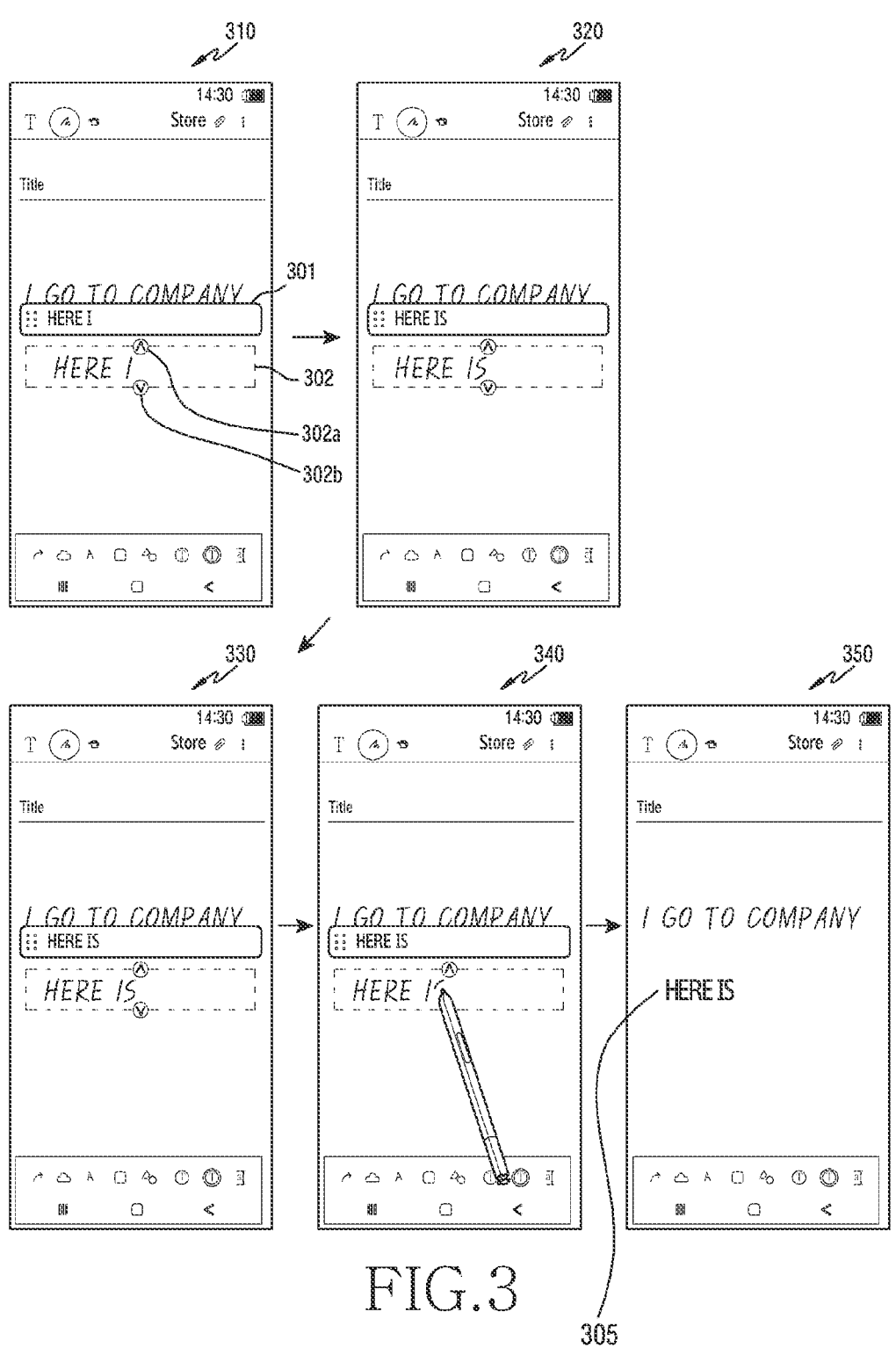
FIG. 3 illustrates a method for processing a handwriting input in an electronic device according to an embodiment.

FIG. 3 illustrates the method for processing the handwriting input in the electronic device according to an embodiment.

In screenshots 310, 320 and 330 of FIG. 3, the processor may perform handwriting recognition in real time correspondingly to sensing of a handwriting input (e.g., a stroke input), and display a preview window 301 in a location (e.g., above) adjacent to the handwriting input, and display a recognized rich text on the preview window 301 in real time. As illustrated in screenshot 340 of FIG. 3, in response to a part of the handwriting input being removed, the processor may re-perform handwriting recognition, or remove a text corresponding to the removed handwriting input.

The preview window 301 may be movable. For example, the processor may touch the preview window 301 and then move the preview window 301 correspondingly to a drag input of a moving user.

The processor may display a visual element (e.g., a dotted-line box) 302 indicating an area in which handwriting recognition is being executed. The visual element 302 may include items 302a and 302b for adjusting a size of the visual element 302. By using the items 302a and 302b, a user may change a size of the area which will perform the handwriting recognition. For example, the user may select (touch or drag) the first item 302a and extend a size of the visual element 302 upward, and may select (touch or drag) the second item 302b and extend the size of the visual element 302 downward. The preview window 301 may be changed in size in response to a change of the size of the visual element 302. The visual element 302 may be changeable in size leftward and rightward.

In response to the change of the size of the handwriting recognition area, the processor may re-perform handwriting recognition for the changed entire area. The processor may perform handwriting recognition for an added recognition area and add the handwriting recognition result of the added recognition area to the exiting the handwriting recognition result. Accordingly, the processor may improve the performance (e.g., speed) of the handwriting recognition (e.g., document layout analysis, line separation, and/or text recognition) of the electronic device.

Figure 4A:
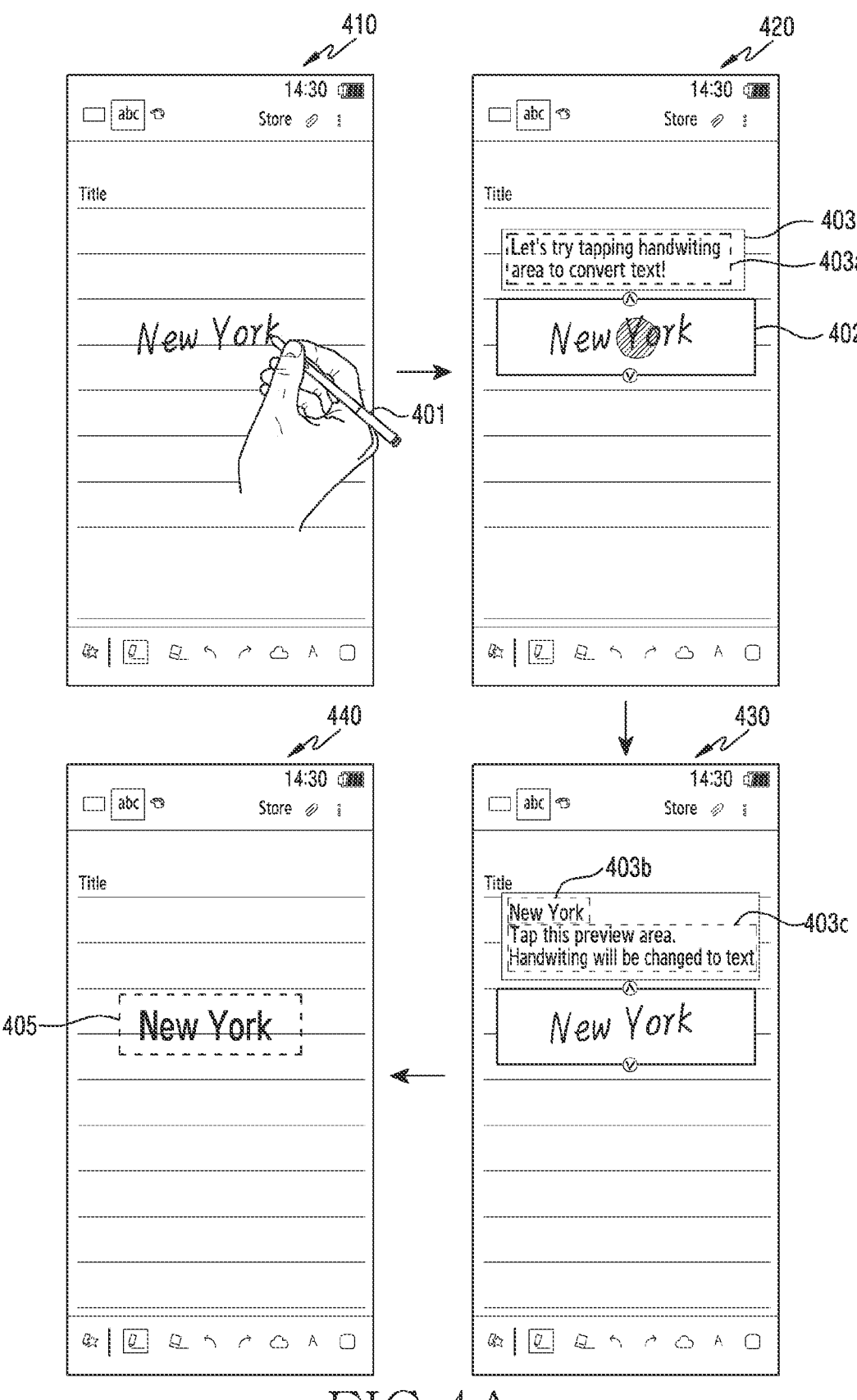
FIG. 4A and FIG. 4B illustrate a method for processing a handwriting input in an electronic device according to an embodiment.
Figure 4B:
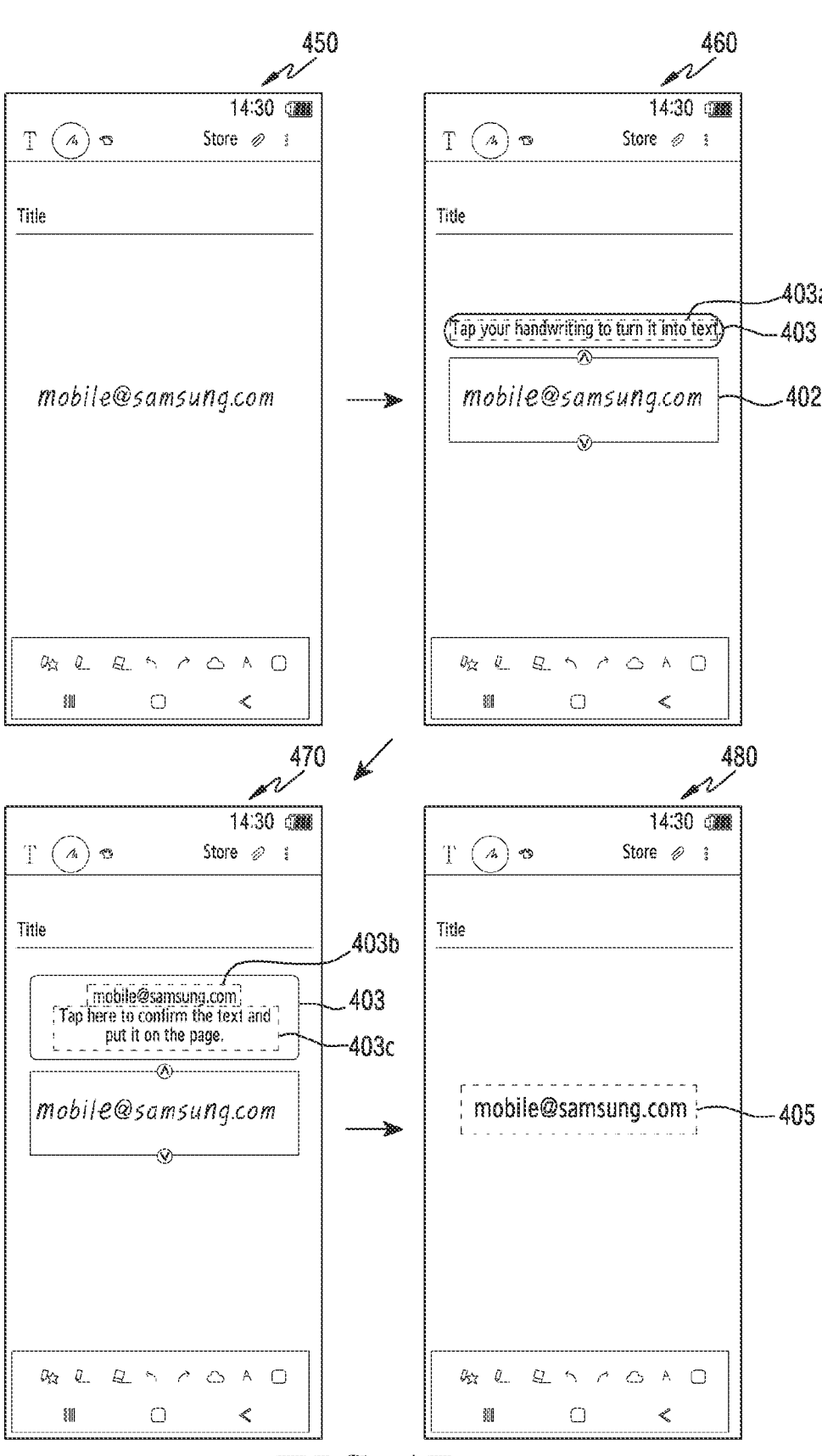

FIGS. 4A and 4B illustrate the method for processing the handwriting input in the electronic device according to an embodiment.

In response to determining that the handwriting input has been completed, the processor may display a preview window. As illustrated in screenshot 410 of FIG. 4A and screenshot 450 of FIG. 4B, the processor may sense a handwriting input through an electronic pen 401. In response to an additional handwriting input not being sensed during a predetermined time (e.g., 300 milliseconds (ms)) after the sensing of the handwriting input, as illustrated in screenshot 420 of FIG. 4A and screenshot 460 of FIG. 4B, the processor may determine an area below a handwriting area in which handwriting recognition has been performed, and display a visual element (e.g., a box) 402 representing the handwriting area, and display a preview window 403 above the handwriting area. By touching (e.g., tap) the handwriting area, the preview window 403 may display a guide phrase 403a notifying that text conversion is possible.

In response to the touch being sensed in the handwriting area, as illustrated in screenshot 430 of FIG. 4A and screenshot 470 of FIG. 4B, the processor may display the recognition result (e.g., rich text) 403b of the handwriting input on the preview window 403. By touching (e.g., tapping) the preview window 403, the processor may display a guide phrase 403c notifying being capable of converting the handwriting input into a text on the preview window 403, together.

Referring back to FIG. 2, in FIGS. 4A and 4B, the processor may perform operations 205 to 209 before display of the preview window 403 is requested (e.g., before the handwriting area is touched). The processor may perform some of operations 205 to 209 as a background before display of the preview window 403 is requested and perform remaining some operations after display of the preview window 403 has been requested. The processor may perform operations 205 to 209 after selection of the handwriting area.

Operation 211 may be omitted in response to a user turning OFF the preview function.

In operation 213, the processor may identify whether a conversion request is sensed. In examples, the processor may identify whether a specified touch input (e.g., a touch/a long touch/a double touch, etc.) is sensed in the preview window, may identify whether an input of a specified button of an electronic pen is sensed, and may identify whether a convert menu displayed at one side of the preview window is selected (e.g., touched).

In response to the conversion request not being sensed as the identifying result of operation 213, the processor may proceed to operation 217 described later. However, in response to the conversion request being sensed as the identifying result of operation 213, in operation 215, the processor may convert (or replace) the handwriting input into the rich text. For example, as illustrated in screenshot 350 of FIG. 3, the processor may remove the handwriting input, and display a rich text 305 to which the attribute and/or characteristic of the handwriting input has been applied. Similarly, as illustrated in screenshot 440 of FIG. 4A and screenshot 480 of FIG. 4B, the processor may remove the handwriting input, and display a rich text 405 to which the attribute and/or characteristic of the handwriting input has been applied.

In operation 217, the processor may identify whether the handwriting input, such as the handwriting app, is ended. In response to the handwriting input not being ended as the identifying result of operation 217, the processor may return to operation 203 and repeat the aforementioned operations. However, in response to the handwriting input being ended as the identifying result of operation 217, the processor may end the handwriting input processing procedure.

Figure 5:
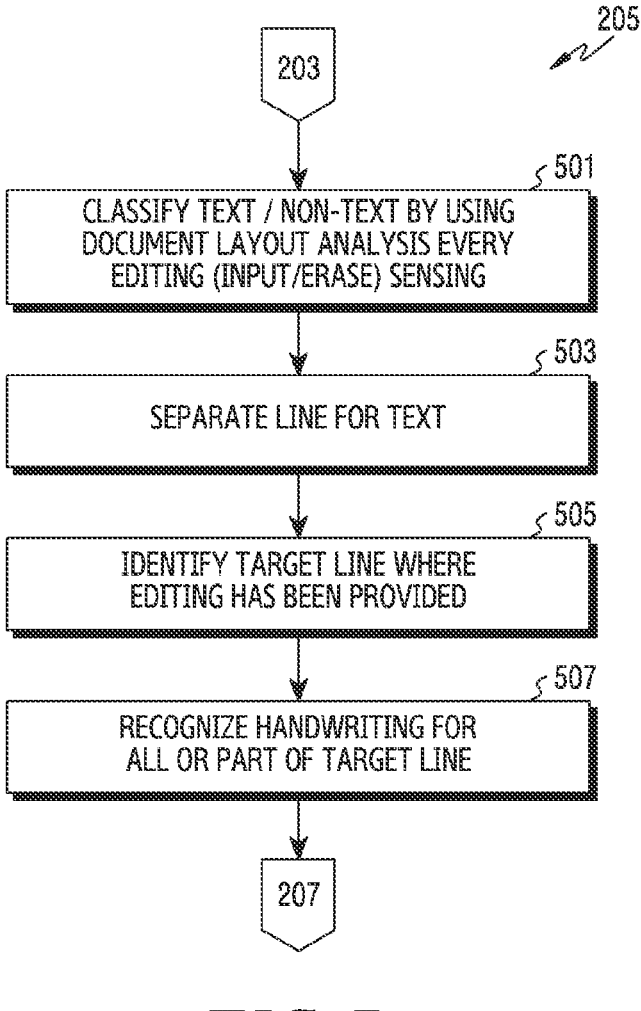
FIG. 5 illustrates a method for converting a handwriting input into a text in an electronic device according to an embodiment.
Figure 6A:
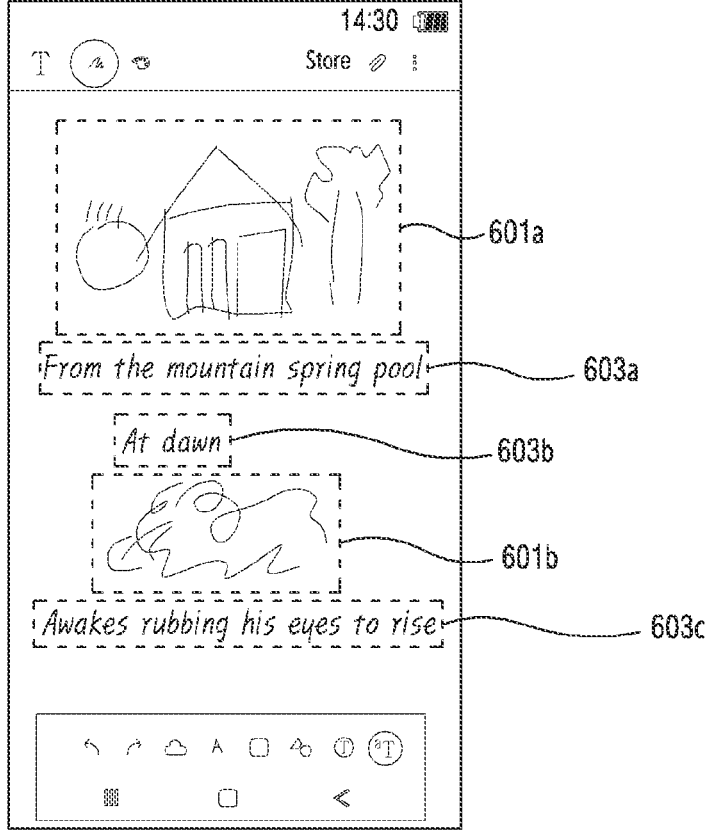
FIG. 6A and FIG. 6B illustrate a method for converting a handwriting input into a text in an electronic device according to an embodiment.
Figure 6B:
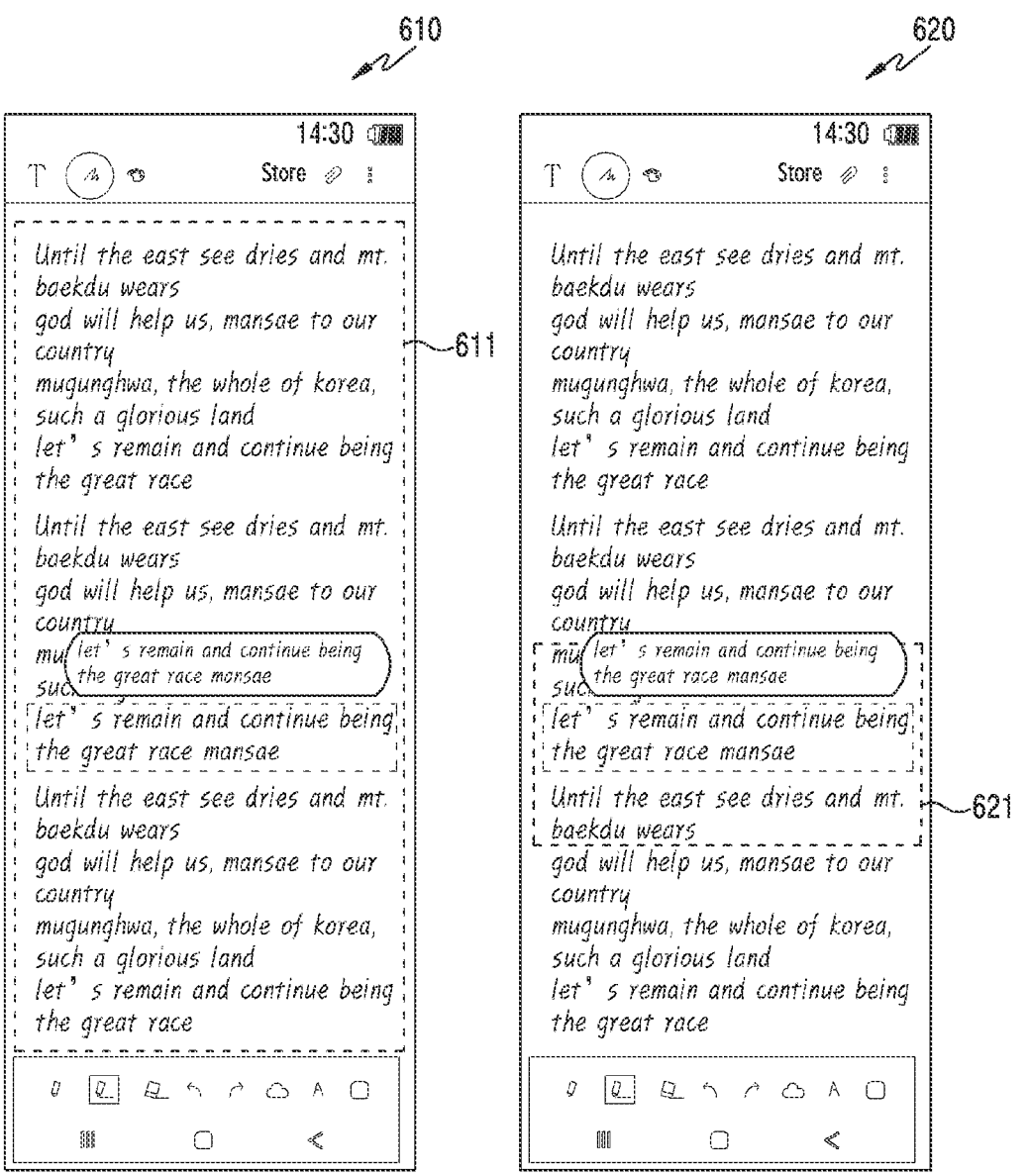

FIG. 5 illustrates a method for converting a handwriting input into a text in an electronic device according to an embodiment. FIGS. 6A and 6B illustrate the method for converting the handwriting input into the text in the electronic device according to an embodiment.

Referring to FIG. 5, 6A and FIG. 6B, in operation 501, a processor (e.g., the processor 120) may classify a text and a non-text by using document layout analysis (DLA) every editing (e.g., input or removal) sensing. The classification may be performed in real time every stroke input. As illustrated in FIG. 6A, the processor may classify drawing inputs 601a and 601b into a non-text, and classify handwriting inputs 603a, 603b, and 603c into a text, based on a database previously stored for the sake of classification of the text and the non-text. The database may be provided by obtaining a feature from non-text data samples and text data samples, or may be provided by training the non-text data samples and the text data samples by using an artificial intelligence (e.g., deep learning).

The processor may classify a text and a non-text based on a set rule such as limitations of a height of an inputted stroke and a length of the stroke.

In operation 503, the processor may perform line separation for the handwriting inputs classified into the text. For example, the processor may perform line separation based on the set rule (e.g., a stroke sequence of handwriting and an input location thereof). For example, the processor may separate the handwriting inputs 603a, 603b, and 603c classified into the texts of FIG. 6A, as mutually different lines.

Operations 501 and 503 may be performed for the entire page every stroke input. However, in response to including several pages (assuming one screen as one page), the handwriting recognition may be delayed. As in screenshot 610 of FIG. 6B, the processor may perform operations 501 and 503 for a current screen (i.e., page) 611. Alternatively, as in screenshot 620 of FIG. 6B, the processor may perform operations 501 and 503 for a predetermined range (e.g., a line where editing has been sensed, a front line, and a rear line) 621 with a criterion of a line where editing has been sensed. The processor may identify a line range that the sensed editing may affect (e.g., identify lines intruded by an added stroke with a criterion of a Y-axis (i.e., a vertical direction)), and perform operations 501 and 503 for the identified line range.

In operation 505, the processor may identify a target line where editing has been provided. For example, in response to a stroke being added (inputting a new stroke, undoing after stroke erasing, or redoing after undoing), the processor may identify a line where the stroke has been added, as the target line. In response to a stroke being erased (e.g., being undone after stroke inputting, being redone after being undone, or being erased), the processor may identify a line where the stroke has been erased, as the target line.

In operation 507, the processor may perform handwriting recognition for all or part of the target line. The target line may be set as one line and, as described in reference to FIG. 3, may be extended into a plurality of lines correspondingly to a user's input to a visual element representing the target line. In response to the handwriting recognition not being possible, the processor may control a display to output an error message. A detailed description of this will be made later with reference to FIG. 9B.

Figure 7:
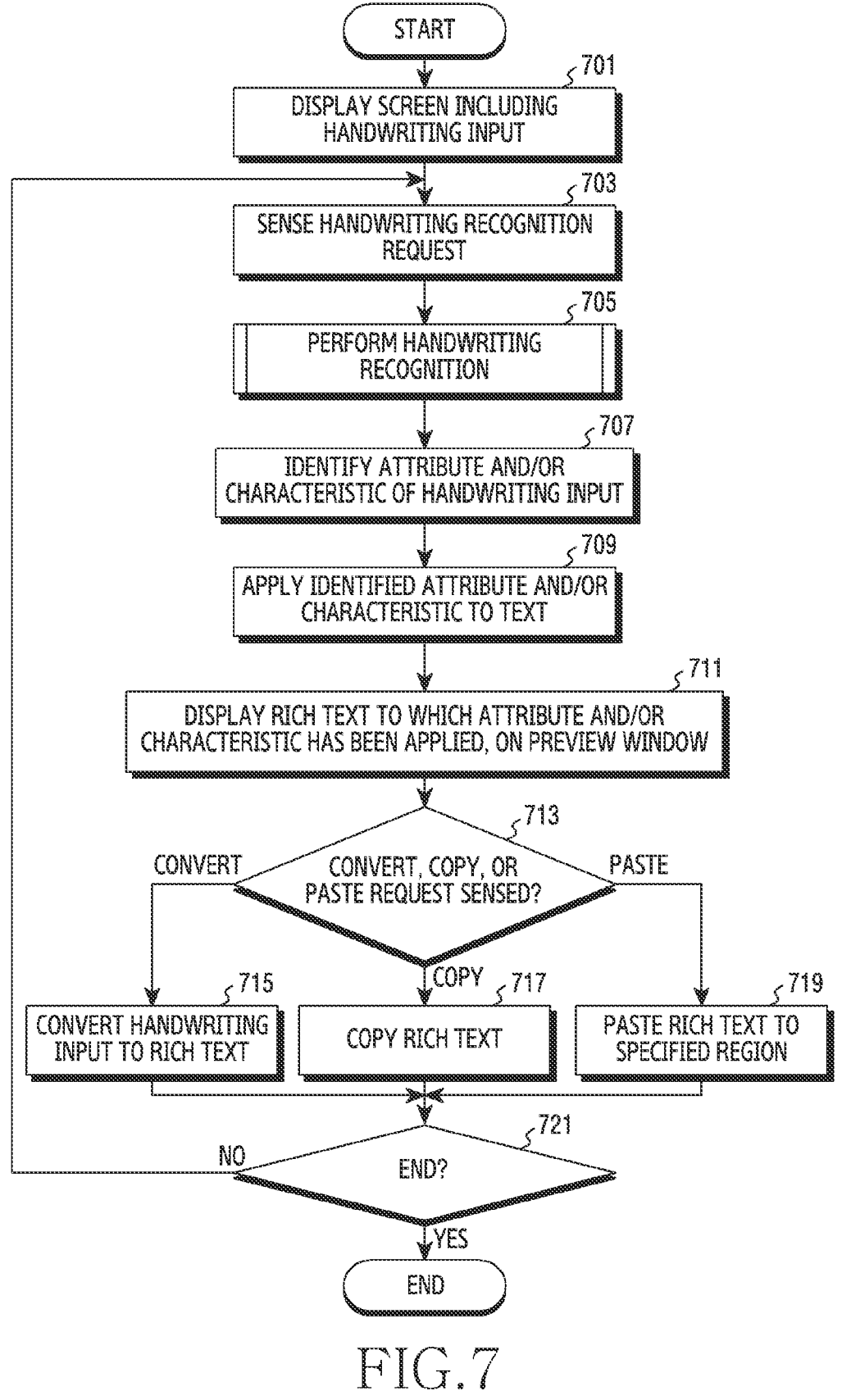
FIG. 7 illustrates a method for processing a handwriting input in an electronic device according to an embodiment.

FIG. 7 illustrates a method for processing a handwriting input in an electronic device according to an embodiment of the present disclosure. FIGS. 8A, 8B, 8C, 8D and 8E illustrate the method for processing the handwriting input in the electronic device according to an embodiment of the present disclosure.

Referring to FIGS. 7, 8A, 8B, 8C, 8D and 8E, in operation 701, a processor (e.g., the processor 120) of the electronic device (e.g., the electronic device 101) may display a screen including a handwriting input. For example, as illustrated in screenshot 805 of FIG. 8A, screenshot 825 of FIG. 8B, screenshot 850 of FIG. 8C, and screenshot 865 of FIG. 8D, the processor may display handwriting (e.g., a memo) which has been previously composed and stored by a user, on a display (e.g., the display device 160). The handwriting may have various attributes and/or characters.

In operation 703, the processor may sense a handwriting recognition request. As illustrated in screenshot 805 of FIG. 8A and screenshot 825 of FIG. 8B, the handwriting recognition request may be sensed through a touch input (e.g., a tap, a double tap, a long touch, etc.) 801 and 828 to a part of the handwriting input (i.e., handwriting). As illustrated in screenshot 850 of FIG. 8C, the handwriting recognition request may be sensed through a touch input to a text convert menu 851. As illustrated in screenshot 865 of FIG. 8D, the handwriting recognition request may be sensed through a touch input to a text obtaining menu 866. As illustrated in FIG. 8E, the text convert menu 851 and/or the text obtaining menu 866 may be displayed around the handwriting input in a floating scheme 881.

In operation 705, the processor may perform handwriting recognition. For example, the processor may convert the handwriting input into a text through the handwriting recognition. A detailed description of the text conversion method will be made later with reference to FIG. 9A.

In operation 707, the processor may identify an attribute and/or characteristic of the handwriting input. In operation 709, the processor may apply the identified attribute and/or characteristic to the text. Operations 707 and 709 are similar to the aforementioned operations 207 and 209 and thus, their detailed description is omitted.

In operation 711, the processor may display the rich text to which the attribute and/or characteristic has been applied, on a preview window. As illustrated in screenshot 810 of FIG. 8A, the processor may display a first preview window 811 including the handwriting recognition result (e.g., a rich text) in a location (e.g., above) adjacent to a line where a touch input of a user has been sensed, and display a first visual element 812 representing a handwriting recognition area. The first preview window 811 may be moved in its location correspondingly to a user's input (e.g., touch and drag). As illustrated in screenshot 810 of FIG. 8A, the handwriting recognition area may be set as one line with a criterion of a point where a touch has been sensed. As illustrated in screenshots 810 and 815 of FIG. 8A, a size of the handwriting recognition area may be adjusted correspondingly to a user input 813 to the first visual element 812. A size of the first preview window 811 may be also changed correspondingly to a change of the size of the handwriting recognition area. In response to the change of the size of the handwriting recognition area, the processor may re-perform the handwriting recognition for the changed entire area or perform handwriting recognition only for an added recognition area.

Figure 8A:
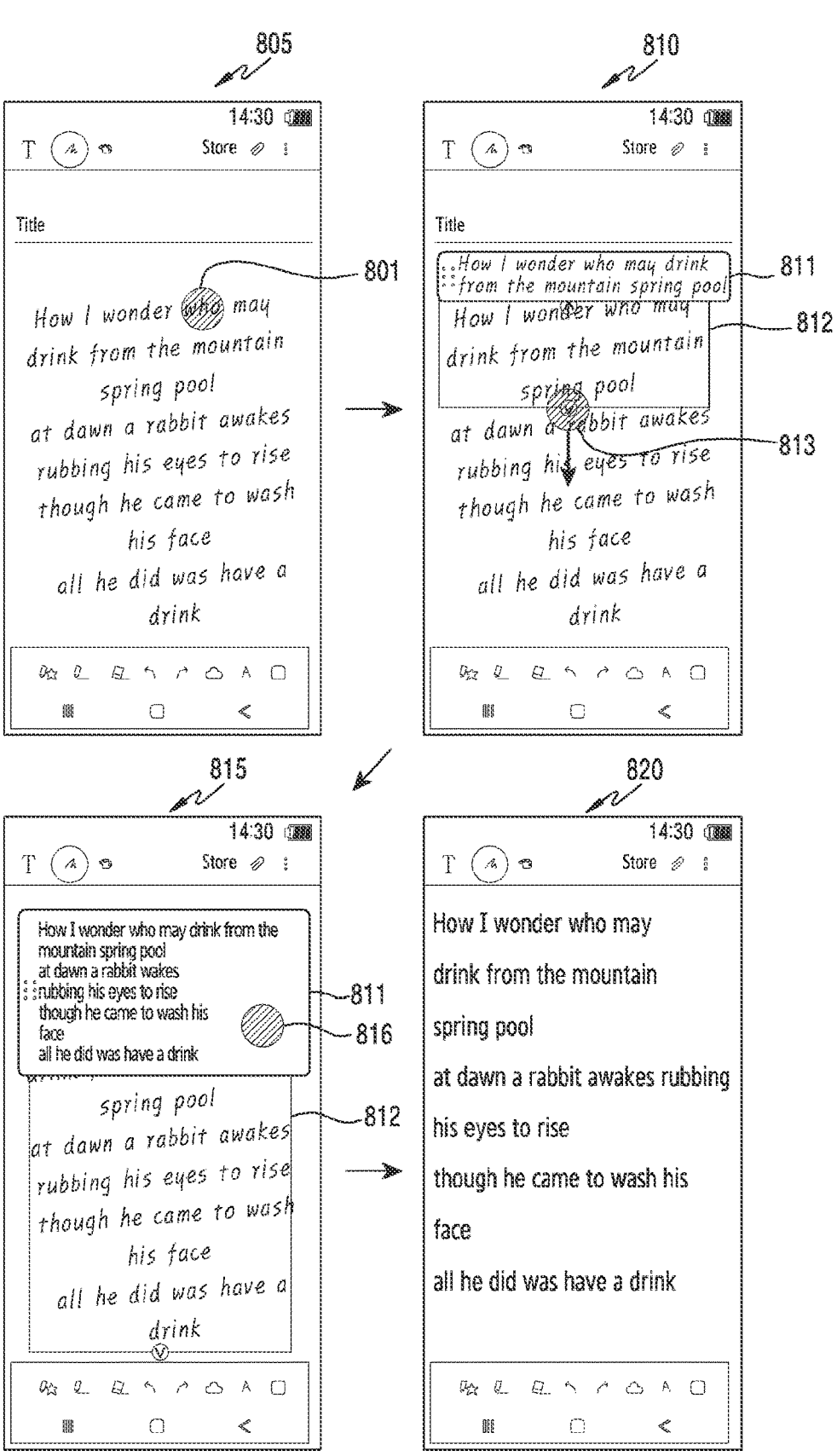
FIGS. 8A, 8B, 8C, 8D and 8E illustrate a method for processing a handwriting input in an electronic device according to an embodiment.
Figure 8B:
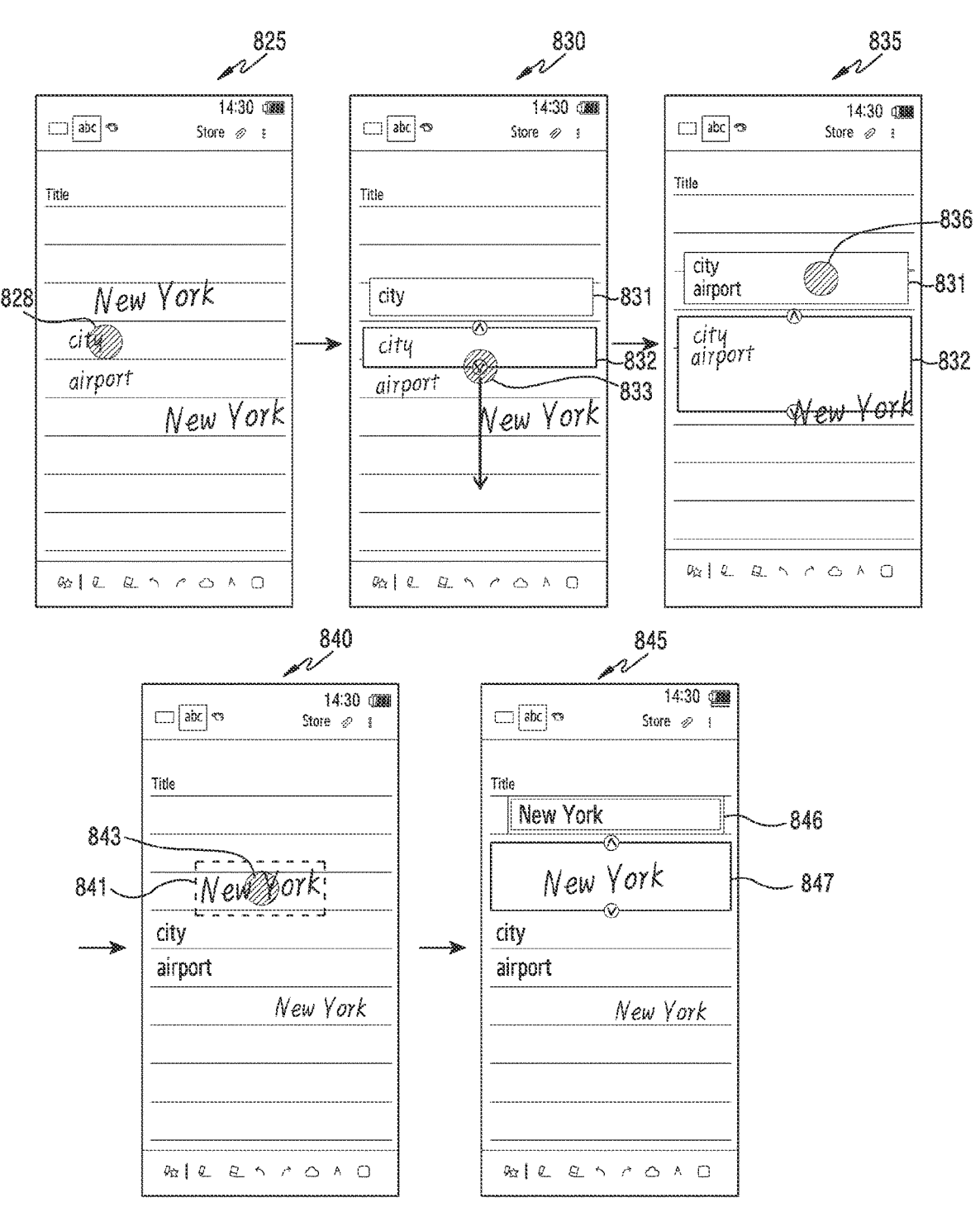

As illustrated in screenshot 830 of FIG. 8B, the processor may display a second preview window 831 including the handwriting recognition result (e.g., a rich text) and a second visual element 832 representing a handwriting recognition area, in a location (e.g., above) adjacent to a line where a user's touch input has been sensed. The second preview window 831 may be moved in its location correspondingly to a user's input (e.g., a touch and drag). As illustrated in screenshots 830 and 835 of FIG. 8B, a size of the handwriting recognition area may be changed correspondingly to a user input 833 of the second visual element 832, and a size of the second preview window 831 may be also changed correspondingly to the change of the size of the handwriting recognition area. In response to the change of the size of the handwriting recognition area, the processor may re-perform handwriting recognition for the entire changed area or perform handwriting recognition only for an added recognition area.

Figure 8C:
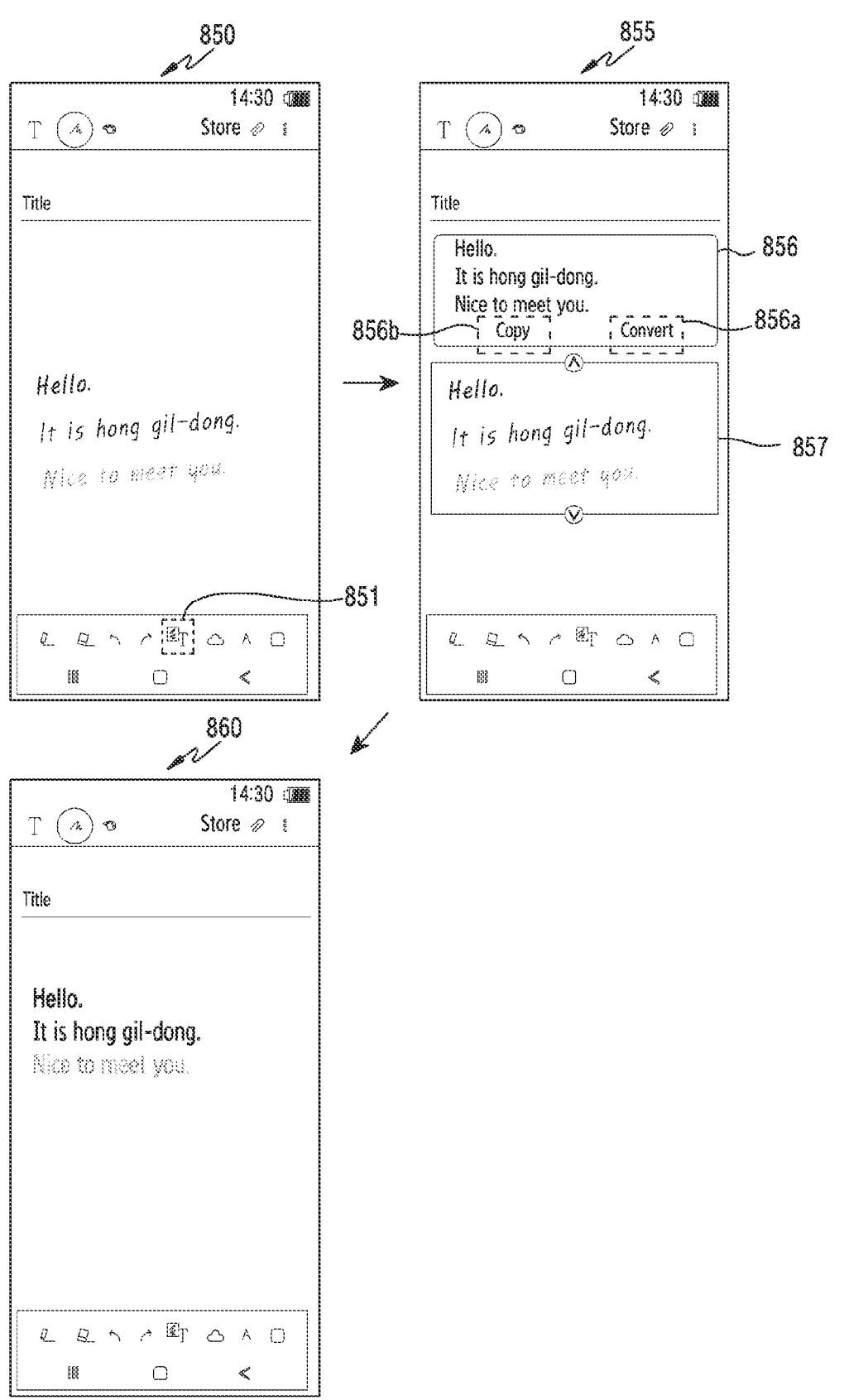

As illustrated in screenshot 855 of FIG. 8C, the processor may display a third preview window 856 including the handwriting recognition result (e.g., a rich text) above a handwriting input, and display a third visual element 857 representing a handwriting recognition area in a surrounding of the handwriting input. The handwriting recognition area may be set as the entire the handwriting input. A size of the handwriting recognition area may be adjusted correspondingly to a user input to the visual element 857. In response to the change of the size of the handwriting recognition area, the processor may re-perform the handwriting recognition for the entire changed area or perform handwriting recognition only for an added recognition area. The third preview window 856 may be moved in its location correspondingly to a user's input (e.g., a touch and drag).

Figure 8D:
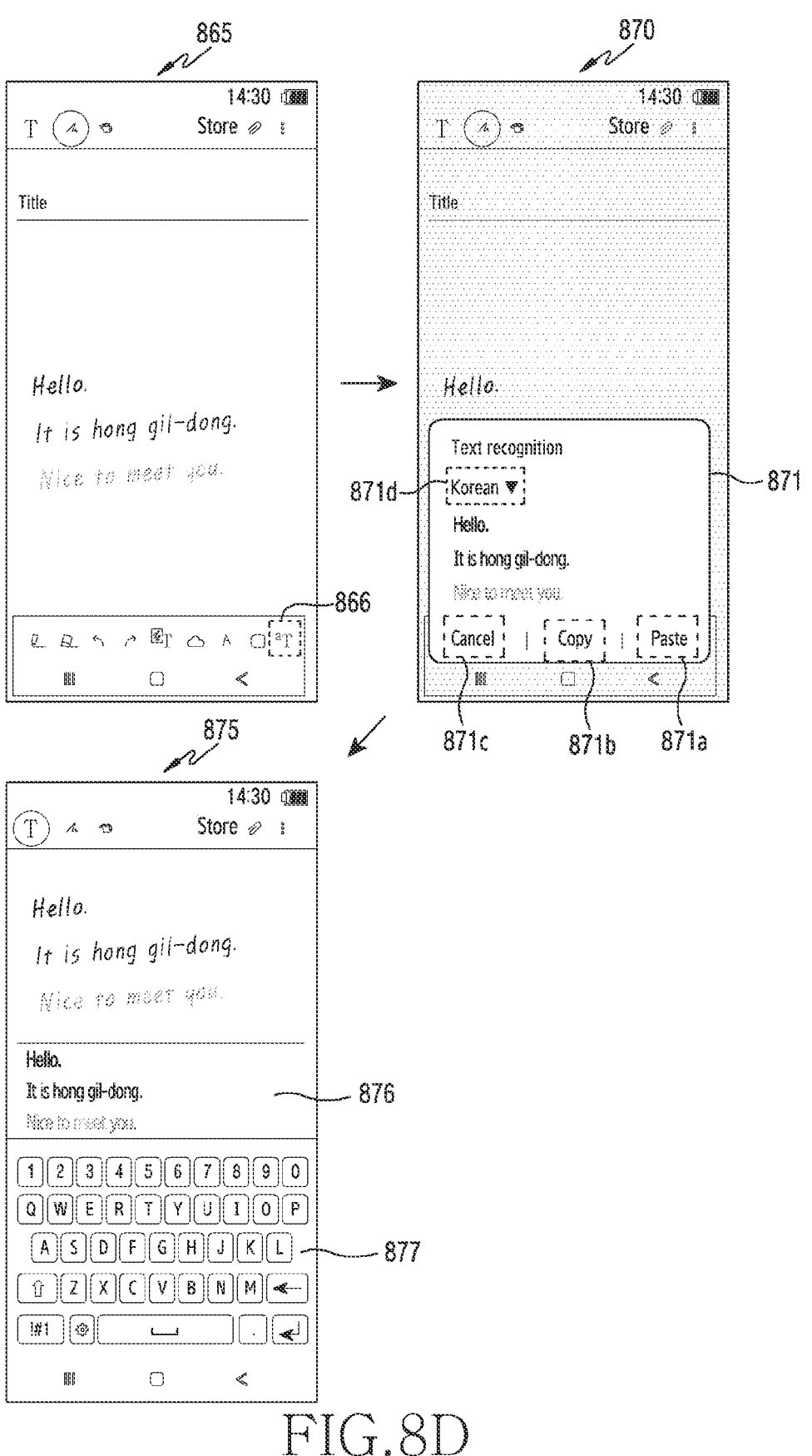
Figure 8E:
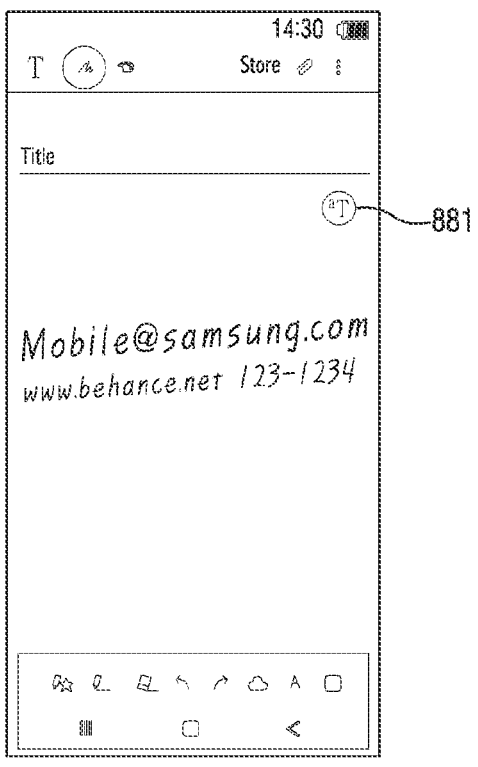

As illustrated in screenshot 870 of FIG. 8D, the processor may display a fourth preview window 871 including the handwriting recognition result (e.g., a rich text) in a floating scheme. The fourth preview window 871 may include the recognition result of the entire handwriting input. The location of the fourth preview window 871 may be moved correspondingly to a user's input (e.g., a touch and drag).

Referring back to FIG. 7, operation 711 may be omitted in response to a user turning OFF the preview function.

In operation 713, the processor may identify whether a conversion, copy, or paste request is sensed. In response to the conversion request being made as the identifying result of operation 713, in operation 715, the processor may convert the handwriting input into the text. For example, as illustrated in screenshots 815 and 820 of FIG. 8A, in response to a specified first touch input (e.g., a tap or a double tap, etc.) 816 being sensed in the first preview window 811, the processor may convert the handwriting input into the rich text to which the attribute and/or characteristic of the handwriting input has been applied. The converted rich text may be displayed in each line by using a separate text box, or may be displayed where a line is distinguished in one text box.

For example, as illustrated in screenshots 835 and 840 of FIG. 8B, in response to a specified first touch input 836 being sensed in the second preview window 831, the processor may convert the handwriting input into the rich text to which the attribute and/or characteristic of the handwriting input has been applied. The converted rich text may be displayed in each line by using a separate text box or be displayed wherein a line is distinguished in one text box. As illustrated in screenshots 840 and 845 of FIG. 8B, in response to sensing that a touch input 843 to another handwriting input 841 is not converted, the processor may perform operations 705 to 711 and display a fifth preview window 846 and a fifth visual element 847.

As illustrated in screenshots 855 and 860 of FIG. 8C, in response to a touch input to a convert menu 856a included in the third preview window 856 being sensed, the processor may convert the handwriting input into the rich text to which the attribute and/or characteristic of the handwriting input has been applied. The converted rich text may be displayed in each line by using a separate text box or may be displayed where a line is distinguished in one text box.

In response to the copy request being made as the identifying result of operation 713, in operation 717, the processor may copy the text. In examples, in response to a specified second touch input (e.g., a long touch) being sensed in the first preview window 811 of FIG. 8A, the processor may copy the rich text included in the first preview window 811. In response to a specified second touch input (e.g., a long touch) being sensed in the second preview window 831 of FIG. 8B, the processor may copy the rich text included in the second preview window 831. In response to sensing a touch input to a copy menu 856b included in the third preview window 856 of FIG. 8C, the processor may copy the rich text included in the third preview window 856. In response to sensing a touch input to a copy menu 871b included in the fourth preview window 871 of FIG. 8D, the processor may copy the rich text included in the fourth preview window 871. The copied rich text may be pasted in a handwriting app which is being currently executed or another app (e.g., a letter app, a webpage, or a short message service (SMS) app) where a text input is possible.

In response to the paste request being made as the identifying result of operation 713, in operation 719, the processor may paste the rich text to a specified area. For example, as illustrated in screenshots 870 and 875 of FIG. 8D, in response to a touch input to a paste menu 871a included in the fourth preview window 871 being sensed, the processor may paste, to an input field 876, the rich text to which the attribute and/or characteristic of the handwriting input has been applied, and display a virtual keyboard 877 capable of editing the rich text included in the input field 876. The pasted rich text may be displayed in each line by using a separate text box or may be displayed wherein a line is distinguished in one text box. The fourth preview window

871 may include an undo menu 871c undoing handwriting recognition, and a language select menu 871d capable of selecting a recognition language.

In operation 721, the processor may identify whether an end command is sensed.

In response to the end command not being sensed as the identifying result of operation 721, the processor may return to operation 703 and repeat the aforementioned operations. In response to the end command being ended as the identifying result of operation 721, the processor may end a handwriting input processing procedure.

In response to a request for obtaining of the rich text being sensed, the processor may control a display to display the handwriting input and the rich text together, without removing the handwriting input. For example, in response to sensing of the obtaining request, the processor may control the display to display the rich text below the handwriting input.

Figure 9A:
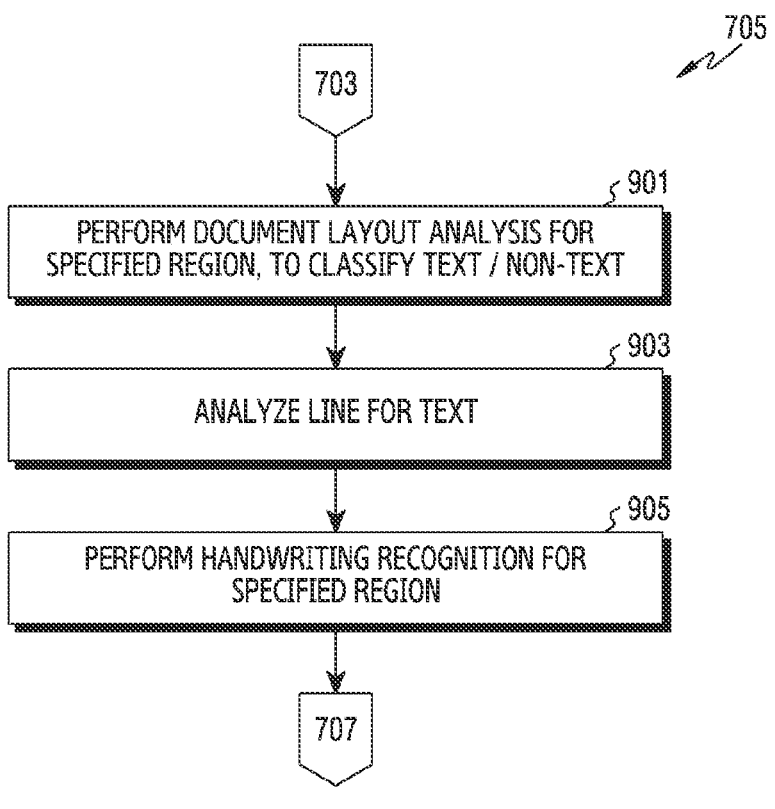
FIG. 9A illustrates a method for converting a handwriting input into a text in an electronic device according to an embodiment.
Figure 9B:
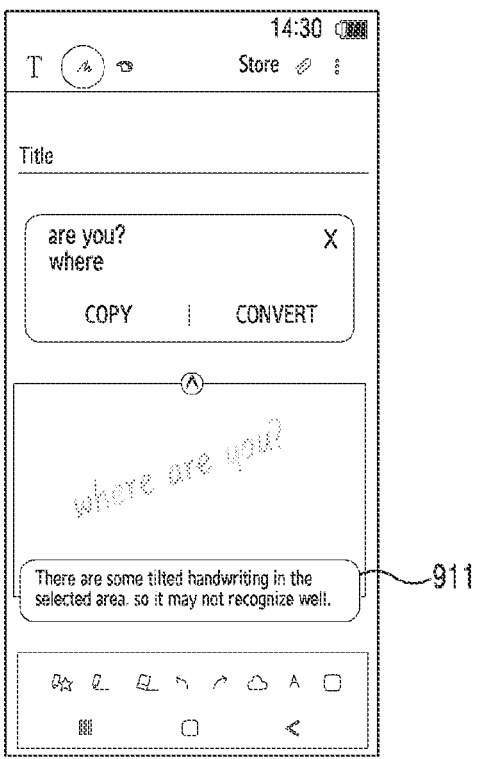
FIG. 9B illustrates a method for converting a handwriting input into a text in an electronic device according to an embodiment.

FIG. 9A illustrates a method for converting a handwriting input into a text in an electronic device according to an embodiment. FIG. 9B illustrates the method for converting the handwriting input into the text in the electronic device according to an embodiment.

Referring to FIGS. 9A and 9B, in operation 901, a processor may perform document layout analysis (DLA) for a specified area (e.g., a handwriting recognition area), to classify a text and a non-text. The specified area may include one line or a set number of lines including a point where a user's touch input has been sensed.

In operation 903, the processor may perform line separation for handwriting inputs classified into the text. For example, the processor may perform the line separation based on a set rule (e.g., a stroke sequence of handwriting and an input location thereof).

In operation 905, the processor may perform handwriting recognition for the specified area. The processor may perform the handwriting recognition as a background for the entire handwriting input or a handwriting input included in a current screen. By previously performing handwriting recognition for a non-specified area, the handwriting recognition result may be quickly presented in response to the specified area being extended by a user.

As illustrated in FIG. 9B, the processor may control a display to output an error message 911 in response to handwriting recognition not being possible. For example, the processor may obtain slope information of a line at the time of handwriting recognition based on the known technologies (e.g., linear regression, a method for calculating an angle at which an aspect ratio of a corresponding line is minimized, etc.), and control the display to output the error message 911 in response to the slope information being greater than a specified angle. Alternatively, in response to the line separation failing in operation 903, the processor may control the display to output the error message 911.

Figure 10:
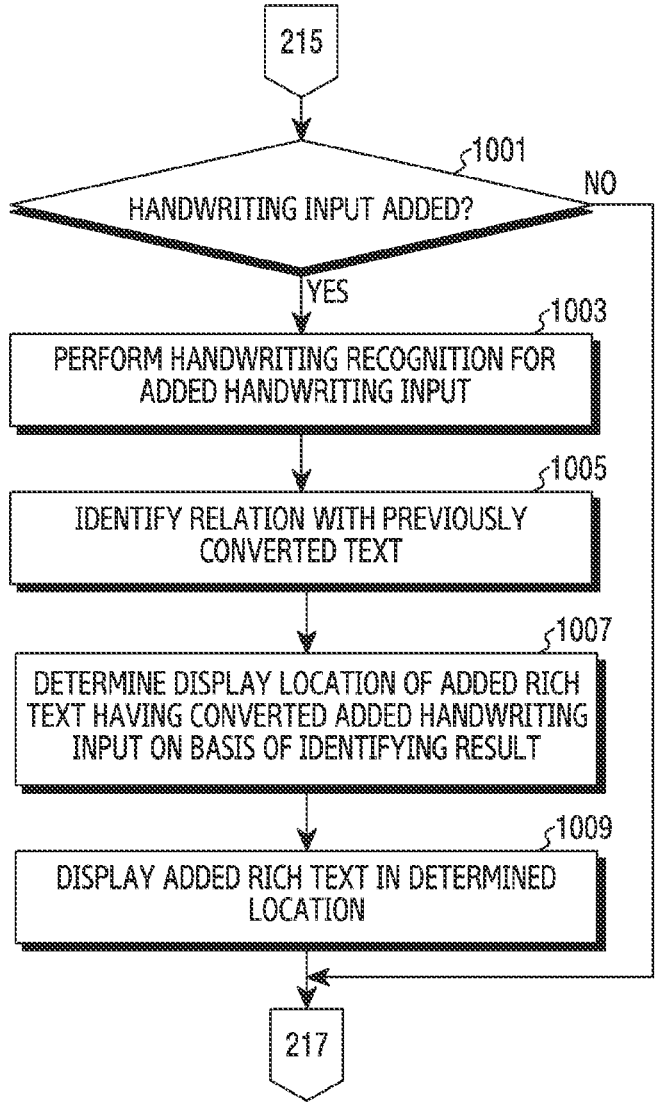
FIG. 10 illustrates a method for adding a text by using a handwriting input in an electronic device according to an embodiment.
Figure 11A:
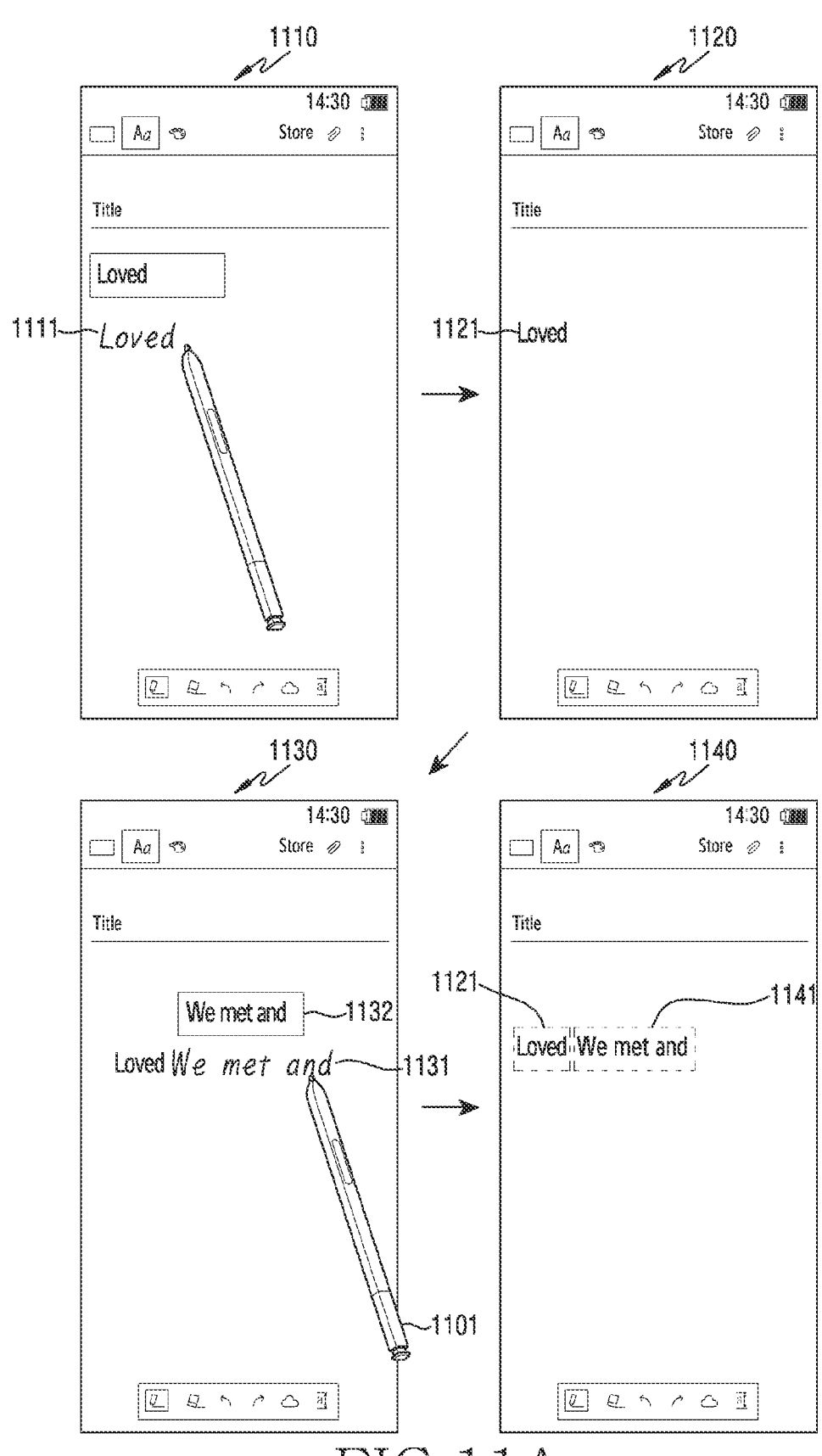
FIGS. 11A and 11B illustrate a method for adding a text by using a handwriting input in an electronic device according to an embodiment.
Figure 11B:
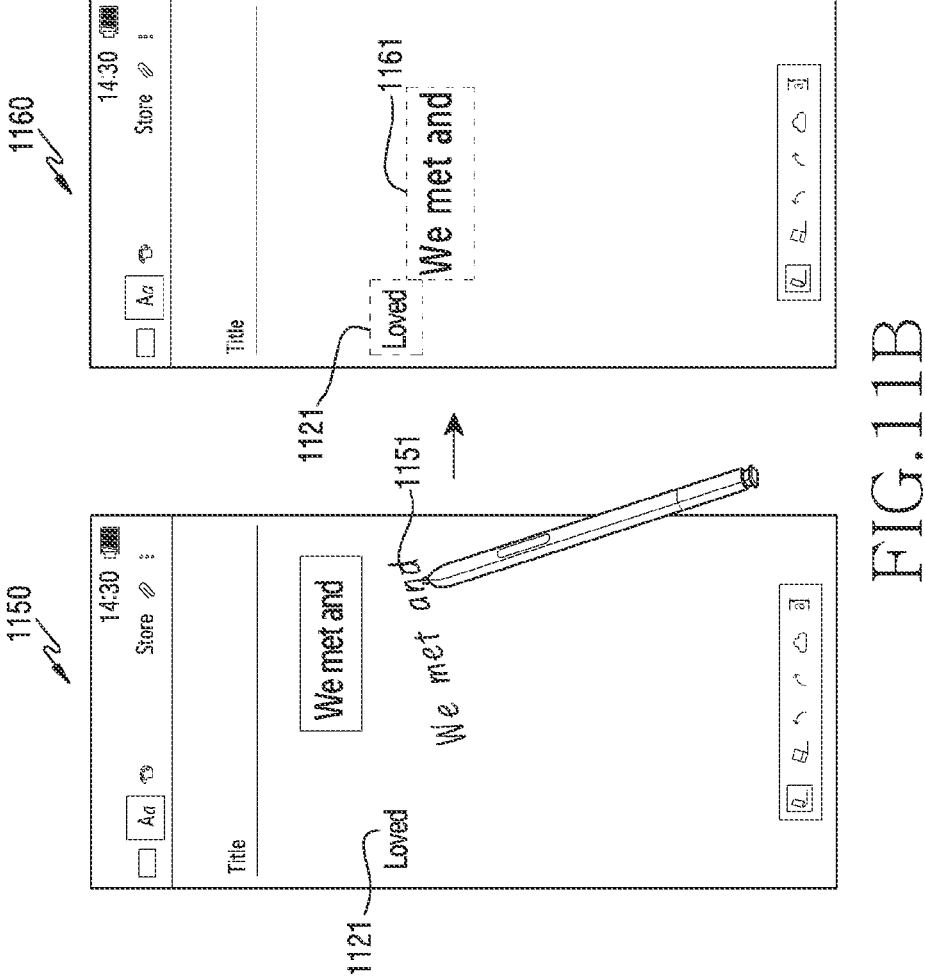

FIG. 10 illustrates a method for adding a text by using a handwriting input in an electronic device according to an embodiment of the present disclosure. FIGS. 11A and 11B illustrate the method for adding the text by using the handwriting input in the electronic device according to an embodiment of the present disclosure.

Referring to FIGS. 10, 11A and 11B, in operation 1001, a processor (e.g., the processor 120) may identify whether a handwriting input is added after operation 215. For example, as illustrated in screenshots 1110, 1120 and 1130 of FIG. 11A, when a first handwriting input "loved" 1111 has completed conversion into a first text 1121, a user may perform an additional handwriting input (below, a second handwriting input) "We met" 1131 by using an electronic pen 1101.

In response to the handwriting input not being added as the identifying result of operation 1001, the processor may proceed to operation 217 where the method ends. However, in response to the handwriting input being added as the identifying result of operation 1001, in operation 1003, the processor may perform handwriting recognition for the added handwriting input. For example, in response to adding the second handwriting input 1131, the processor may display the recognition result of the second handwriting input 1131 on a preview window 1132.

In operation 1005, the processor may identify a relation with a previously converted text. For example, the processor may identify whether the first text 1121 and the second handwriting input 1131 are continuous texts. The processor may identify the relation based on a size, color, or location of the second handwriting input 1131. For example, as illustrated in screenshot 1130 of FIG. 11A, in response to the size and color of the second handwriting input 1131 being similar to a size and color of the first text 1121, and the second handwriting input 1131 being initiated adjacent to the last letter of the first text 1121, the processor may determine that these inputs are related to each other (e.g., continuous sentences). However, as illustrated in screenshot 1150 of FIG. 11B, in response to a size and color of a third handwriting input 1151 being different from the size and color of the first text 1121 and being spaced more than a predetermined distance from the first text 1121, the processor may determine that these inputs are not related to each other (e.g., separate sentences). The processor may identify the relation through context recognition and may determine line separation or non-separation based on whether the added handwriting input is overlapped with the first text 1121 at an X-axis and/or Y-axis.

In operation 1007, the processor may determine a display location of an additional rich text having converted the added handwriting input, based on the identifying result. In operation 1009, the processor may display the additional rich text in the determined location. For example, as illustrated in screenshot 1140 of FIG. 11A, the processor may display a second text 1141 having converted the second handwriting input 1131, in continuation of the first text 1121. The first text 1121 and the second text 1141 may be included in one text box. As illustrated in screenshot 1160 of FIG. 11B, the processor may display a third text 1161 having converted a third handwriting input 1151, in a line different from that of the first text 1121. The first text 1121 and the third text 1161 may be included in one text box and the lines may be separated. The first text 1121 and the third text 1161 may be included in separate text boxes.

Figure 12:
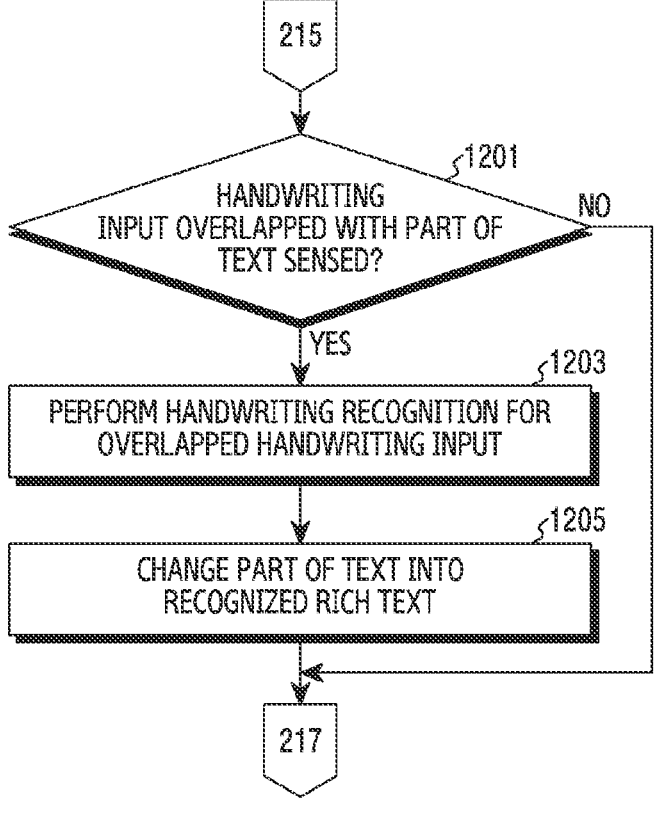
FIG. 12 illustrates a method for revising a text by using a handwriting input in an electronic device according to an embodiment.
Figure 13:
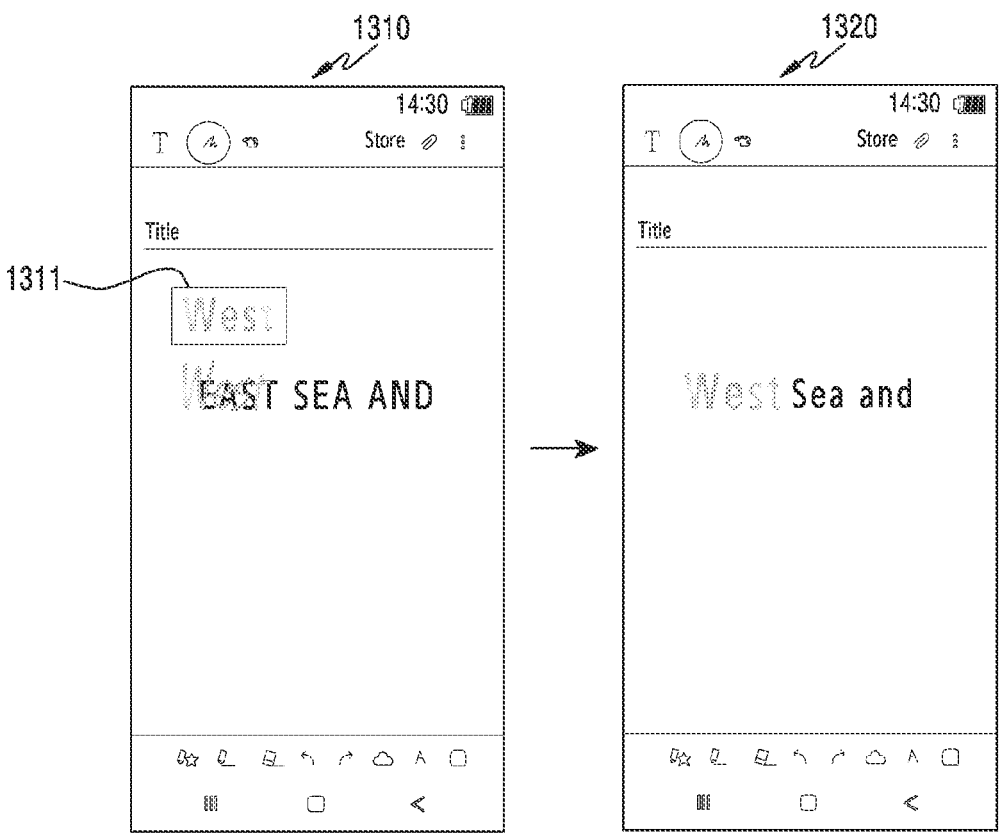
FIG. 13 illustrates a method for revising a text by using a handwriting input in an electronic device according to an embodiment.

FIG. 12 illustrates a method for revising a text by using a handwriting input in an electronic device according to an embodiment. FIG. 13 illustrates the method for revising the text by using the handwriting input in the electronic device according to an embodiment.

Referring to FIGS. 12 and 13, in operation 1201, a processor (e.g., the processor 120) may identify whether a handwriting input (i.e., a fourth handwriting input) over-lapped with a part of a text is sensed after operation 215.

In response to the handwriting input overlapped with the text not being sensed as the identifying result of operation 1201, the processor may proceed to operation 217 where the method ends. However, in response to the handwriting input overlapped with the text being sensed as the identifying result of operation 1201, in operation 1203, the processor may perform handwriting recognition for the overlapped handwriting input. For example, as illustrated in screenshot 1310 of FIG. 13, in response to a user inputting a handwrit-ing input "West" to overlap with a part "East" of a text intended to be revised, the processor may perform opera-tions 205 to 211 of FIG. 2, and display a rich text "West" on a preview window 1311.

In operation 1205, the processor may change a part of the rich text into a recognized rich text. For example, as illus-trated in screenshot 1320 of FIG. 13, the processor may change the part "East" of the text overlapped with the handwriting input into a new rich text "West". The change of the text may be performed at the time of conversion request (e.g., a touch input on a preview window, a lapse of a predetermined time, a menu input, or a specified button input of an electronic pen, etc.).

According to an embodiment, a method for processing a handwriting input in an electronic device (e.g., the electronic device 101) includes converting a first handwriting input of a user into a text by performing handwriting recognition for the first handwriting input, identifying at least one of an attribute or characteristic of the first handwriting input, applying at least one of the identified attribute or character-istic to the converted text, and in response to a request for conversion of the first handwriting input, replacing the first handwriting input into a text (hereinafter, a first rich text) to which the identified at least one of the attribute or charac-teristic has been applied.

The method further includes presenting, before replacing the first handwriting input into the first rich text, a preview window comprising the first rich text to a location adjacent to the first handwriting input.

The method further includes at least one of, in response to a request for copy of the first rich text being detected, copying the first rich text comprised in the preview window, or in response to a request for obtaining of the first rich text being detected, displaying the first handwriting input with the first rich text.

Performing the handwriting recognition may comprise one of performing the handwriting recognition for the first handwriting input in response to detecting the first hand-writing input, in response to an additional handwriting input not being detected during a specified time after detecting the first handwriting input, performing the handwriting recog-nition for the first handwriting input, or in response to a handwriting recognition command by a user being received, performing the handwriting recognition for the first hand-writing input.

The method further includes in response to editing of a portion of the first handwriting input being detected, re-performing the handwriting recognition for a range which has been specified with a criterion of the edited portion.

Presenting the preview window may comprise presenting a rich text for a specified range of the first handwriting input through the preview window, wherein the specified range may comprise one line, a plurality of lines which have been specified with a criterion of a location where the handwriting input has been provided, or one screen, and may be change-able by a user.

The method further includes detecting the addition of a second handwriting input after replacing the first handwrit-ing input into the first rich text, identifying a relationship between the second handwriting input and the first rich text, determining a location of a second rich text having con-verted the second handwriting input, based on the identified relationship, and displaying the second rich text in the determined location.

The method further includes detecting the addition of a third handwriting input overlapped with at least part of the first rich text after replacing the first handwriting input into the first rich text, and replacing at least part of the first rich text into a third rich text having converted the third handwriting input.

Performing the handwriting recognition may comprise classifying the first handwriting input into a text and a non-text, performing line separation for the classified text, identifying at least one target line which will perform the handwriting recognition, and performing the handwriting recognition for the entire or part of the identified at least one target line.

The method further includes outputting an error message in response to the line separation not being possible or the handwriting recognition not being possible.

Embodiments of the present disclosure may consider an attribute and/or characteristic of a handwriting input at handwriting recognition, to perform text conversion.

Embodiments of the disclosure may perform the handwriting recognition in real time and present the handwriting recognition result through a preview window, so a user may recognize the handwriting recognition result in real time. In response to there being a problem in the handwriting recognition (e.g., erroneous recognition or recognition impossibility), the user may immediately revise the handwriting input, thereby enhancing a user's convenience.

The electronic device according to embodiments may be one of various types of electronic devices. The electronic devices may include a portable communication device (e.g., a smartphone), a computer device, a portable multimedia device, a portable medical device, a camera, a wearable device, or a home appliance. The electronic devices are not limited to those described above.

It should be appreciated that embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the items unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another and do not limit the components in importance or order.

It is to be understood that if a first element is referred to, with or without the term "operatively" or "communicatively", as "coupled with," "coupled to," "connected with," or "connected to" a second element, this indicates that the first element may be coupled with the second element directly (e.g., wiredly), wirelessly, or via a third element.

As used herein, the term "module" may include a unit implemented in hardware, software, or firmware, and may interchangeably be used with other terms "logic," "logic block," "part," or "circuitry". A module may be a single integral component, or a minimum unit or part thereof, adapted to perform one or more functions. The module may be implemented in a form of an application-specific integrated circuit (ASIC).

Embodiments as set forth herein may be implemented as software (e.g., the program 140) including one or more instructions that are stored in a storage medium (e.g., internal memory 136, or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

A method according to embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. The integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

While the disclosure has been particularly shown and described with reference to certain embodiments thereof, it will be understood by those skilled in the art that various changes in form and details may be made therein without departing from the scope of the subject matter as defined by the appended claims and their equivalents.

What is claimed is:

1. An electronic device comprising:
a touch screen;
at least one processor; and
memory storing instructions that, when executed by the at least one processor, cause the electronic device to:
detect a handwriting recognition request for a handwriting input while displaying the handwriting input on the touch screen, in response to detecting the handwriting recognition request, perform handwriting recognition to the handwriting input to identify a text corresponding to the handwriting input, apply, at least one of color, size, thickness or a line of the handwriting input identified based on the handwriting recognition, to the text, display a rich text character to which the at least one of color, size, thickness or a line has been applied, adjacent to the handwriting input, the rich text character being displayed in a first text box separate from a second text box including the handwriting input while the handwriting input is being displayed, the rich text character being a same character as the handwriting input, and in response to detecting a request for replacing the handwriting input with the rich text character, replace the handwriting input with the rich text character.

2. The electronic device of claim 1, wherein the instructions, when executed by the at least one processor, further cause the electronic device to:

display a visual element representing a handwriting recognition area based on detecting the handwriting recognition request, and in response to detecting a user input to the visual element, adjust a size of the handwriting recognition area correspondingly to the user input.

3. The electronic device of claim 2, wherein the instructions, when executed by the at least one processor, further cause the electronic device to:

in response to adjusting the size of the handwriting recognition area, perform the handwriting recognition for an entire area of the adjusted handwriting recognition area or an added recognition area.

4. The electronic device of claim 1, wherein the instructions, when executed by the at least one processor, further cause the electronic device to:

classify the handwriting input into a text and a non-text, perform line separation for the classified text, identify at least one target line which will perform the handwriting recognition, and perform the handwriting recognition for an entirety or a part of the identified at least one target line.

5. The electronic device of claim 1, wherein the instructions, when executed by the at least one processor, further cause the electronic device to:

display the rich text character so that a line is separated in one text box based on a result of the handwriting recognition.

6. The electronic device of claim 5, wherein the instructions, when executed by the at least one processor, further cause the electronic device to:

in response to detecting a request for copying the rich text character, copy the rich text character comprised in the one text box, or in response to detecting a request for obtaining the rich text character, display the handwriting input with the rich text character.

7. The electronic device of claim 1, wherein the instructions, when executed by the at least one processor, further cause the electronic device to:

detect a specified touch input to the rich text character while presenting the rich text character adjacent to the handwriting input, and in response to detecting the specified touch input to the rich text character, present the rich text character at a moved location corresponding to the specified touch input.

8. The electronic device of claim 1, wherein the instructions, when executed by the at least one processor, further cause the electronic device to:

output an error message in response to the handwriting recognition not being possible.

9. A method for processing a handwriting input in an electronic device, the method comprising:

detecting a handwriting recognition request for a handwriting input while displaying the handwriting input on a touch screen of the electronic device, in response to detecting the handwriting recognition request, performing handwriting recognition to the handwriting input to identify a text corresponding to the handwriting input, applying, at least one of color, size, thickness or a line of the handwriting input identified based on the handwriting recognition, to the text, displaying a rich text character to which the at least one of color, size, thickness or a line has been applied, adjacent to the handwriting input, the rich text character being displayed in a first text box separate from a second text box including the handwriting input while the handwriting input is being displayed, the rich text character being a same character as the handwriting input, and in response to a detecting request for replacing the handwriting input with the rich text character, replacing the handwriting input with the rich text character.

10. The method of claim 9, wherein performing the handwriting recognition comprises:

displaying a visual element representing a handwriting recognition area based on detecting the handwriting recognition request, and in response to detecting a user input to the visual element, adjusting a size of the handwriting recognition area correspondingly to the user input.

11. The method of claim 10, further comprising:

in response to adjusting the size of the handwriting recognition area, performing the handwriting recognition for an entire area of the adjusted handwriting recognition area or an added recognition area.

12. The method of claim 9, wherein performing the handwriting recognition comprises:

classifying the handwriting input into a text and a non-text, performing line separation for the classified text, identifying at least one target line which will perform the handwriting recognition, and performing the handwriting recognition for an entirety or a part of the identified at least one target line.

13. The method of claim 9, further comprising:

displaying the rich text character so that a line is separated in one text box based on a result of the handwriting recognition.

14. The method of claim 13, further comprising:

in response to detecting a request for copying the rich text character, copying the rich text character comprised in the one text box, or in response to detecting a request for obtaining the rich text character, displaying the handwriting input with the rich text character.

15. The method of claim 9, further comprising:

detecting a specified touch input to the rich text character while presenting the rich text character adjacent to the handwriting input, and in response to detecting the specified touch input to the rich text character, presenting the rich text character at a moved location corresponding to the specified touch input.

16. The method of claim 9, further comprising:

outputting an error message in response to the handwriting recognition not being possible.

17. An electronic device comprising:

a touch screen;

at least one processor; and memory storing instructions that, when executed by the at least one processor, cause the electronic device to:

detect a handwriting recognition request for a handwriting input while displaying the handwriting input on the touch screen, in response to detecting the handwriting recognition request, perform handwriting recognition to the handwriting input to identify a text corresponding to the handwriting input, apply, at least one of color, size, thickness or a line of the handwriting input identified based on the handwriting recognition, to the text, display a rich text character to which the at least one of color, size, thickness or a line has been applied, adjacent to the handwriting input, the rich text character being displayed in a first text box separate from a second text box including the handwriting input while the handwriting input is being displayed, the rich text character being a same character as the handwriting input, and in response to detecting a request for adding the rich text character display the rich text character adjacent to the handwriting input.

18. The electronic device of claim 17, wherein the instructions, when executed by the at least one processor, further cause the electronic device to:

display a visual element representing a handwriting recognition area based on detecting the handwriting recognition request, and in response to detecting a user input to the visual element, adjust a size of the handwriting recognition area correspondingly to the user input.

19. The electronic device of claim 18, wherein the instructions, when executed by the at least one processor, further cause the electronic device to:

in response to adjusting the size of the handwriting recognition area, perform the handwriting recognition for an entire area of the adjusted handwriting recognition area or an added recognition area.

* * * * *